(12) United States Patent
Shagdar et al.

(10) Patent No.: US 8,072,925 B2
(45) Date of Patent: Dec. 6, 2011

(54) MULTI-HOP WIRELESS NETWORK SYSTEM

(75) Inventors: Oyunchimeg Shagdar, Kyoto (JP); Masanori Nozaki, Tokyo (JP); Youiti Kado, Tokyo (JP); Bing Zhang, Koganei (JP); Mehdad Nori Shirazi, Koganei (JP); Seiji Igi, Koganei (JP); Naoto Kadowaki, Kyoto (JP); Sadao Obana, Kyoto (JP)

(73) Assignees: Oki Electric Industry Co., Ltd., Tokyo (JP); Advanced Telecommunications Research Institute International, Kyoto (JP); National Institute of Information and Communications Technology, Tokyo (JP)

( * ) Notice: Subject to any disclaimer, the term of this patent is extended or adjusted under 35 U.S.C. 154(b) by 619 days.

(21) Appl. No.: 12/282,067

(22) PCT Filed: Mar. 8, 2006

(86) PCT No.: PCT/JP2006/304458
§ 371 (c)(1),
(2), (4) Date: Sep. 8, 2008

(87) PCT Pub. No.: WO2007/102208
PCT Pub. Date: Sep. 13, 2007

(65) Prior Publication Data
US 2009/0092083 A1 Apr. 9, 2009

(51) Int. Cl.
H04W 4/00 (2009.01)
(52) U.S. Cl. ....................................................... 370/328
(58) Field of Classification Search .................. 370/328, 370/310.2, 332, 338, 349, 331, 312, 319, 370/344, 348, 277, 279, 253, 252, 203, 313, 370/432, 471; 455/452.2, 456.6
See application file for complete search history.

(56) References Cited

U.S. PATENT DOCUMENTS 7,965,618 B2 * 6/2011 Zhou et al. ..................... 370/203

FOREIGN PATENT DOCUMENTS

JP 2005-72720 A 3/2005
(Continued)

OTHER PUBLICATIONS

Japanese Office Action dated Mar. 16, 2010, issued in corresponding Japanese Patent Application No. 2007-541514.

(Continued)

Primary Examiner — Chi Pham
Assistant Examiner — Alexander Boakye
(74) Attorney, Agent, or Firm — Westerman, Hattori, Daniels & Adrian, LLP

(57) ABSTRACT

A source terminal measures characteristics of the path at the source terminal itself, produces a characteristics-measurement packet, and transmits the produced characteristics-measurement packet to a relay terminal. Upon receiving the characteristics-measurement packet, the relay terminal measures characteristics of the path at the relay terminal itself, renews the characteristics of the path included in the characteristics-measurement packet using the measured characteristics of the path, and transmits the characteristics of the wireless communication path to the destination terminal. The source terminal produces an admission-request packet and transmits the packet to the destination terminal. Upon receiving the admission-request packet, the destination terminal allows or rejects the traffic quality maintenance request according to the characteristics of the wireless communication path. The allowance or rejection of the quality maintenance request is transmitted to the source terminal with the admission-reply packet by the destination terminal.

15 Claims, 17 Drawing Sheets

FOREIGN PATENT DOCUMENTS

| | | |
|---|---|---|
| JP | 2005-509382 A | 4/2005 |
| WO | 03/041431 A1 | 5/2003 |

OTHER PUBLICATIONS

Chinese Office Action dated Mar. 3, 2011, issued in corresponding Chinese Patent Application No. 200680053750.9.

Namhi Kang; Quality of Service Extension to Dynamic MANET OnDemand Routing Protocol draft-kang-dymoqos-01.txt; Internet Draft; Mar. 2, 2006; pp. 1-13; cited ISR.

Stuart J. Kerry et al. "Amendment: Medium Access Control (MAC) Quality of Service (QoS) Enhancements," IEEE P802.11e/D13.0; Jan. 2005; pp. 1, 8-9, 47-49, 73, 77-82, 89 and 174-181.

International Search Report of PCT/JP2006/304458, date of mailing May 23, 2006.

Japanese Office Action dated Sep. 14, 2010, issued in corresponding Japanese Patent Application No. 2007-541514.

Questioning of the Examiner in an appeal stage issued on Sep. 6, 2011 for corresponding Japanese patent Application No. 2007-541514. (wEnglish translation).

* cited by examiner

Fig.4

| Element ID | Total Length | Measurement Type1 | Unable to measure1 | Length1 | Measured value1 | Measurement Type2 | Unable to measure2 | Length2 | Measured value2 | Measurement Type3 | Unable to measure3 | Length3 | Measured value3 |
|---|---|---|---|---|---|---|---|---|---|---|---|---|---|

RMP

Fig.5

ADDTSrequest

| Category |
|---|
| Action |
| Dialog token |
| Admitted |
| TSPEC |

Fig.6

ADDTSreply

| Category |
|---|
| Action |
| Dialog token |
| Status code |
| TSPEC | ized. The IEEE 802.11e protocol gives priority channel access to traffic of an Access Category with higher priority according to the EDCA (Enhanced Distributed Channel Access).

MULTI-HOP WIRELESS NETWORK SYSTEM

TECHNICAL FIELD

The present invention relates to multi-hop wireless network systems and, in particular, to multi-hop wireless network systems that perform admission control of Quality of Service (QoS) requests from sources.

BACKGROUND ART

Multimedia traffic including voice or video requires high quality for factors such as delay, jitter of delay or packet delivery ratio. Therefore, in order to relay such traffic in priority to other traffic (for example, text or image-downloading), techniques such as admission control (dynamic reservation of resources), classifier (classification of traffic), shaping and policing (keeping the burst to a defined level), and packet scheduling (transmitting the packet that corresponds to each group) are required.

The IEEE 802.11e protocol targeting single-cell wireless LANs (Local Area Networks) is being developed in order to control QoS (Quality of Service) of multimedia traffic.

The IEEE 802.11e provides functions of admission control, classifier, and packet scheduling for IEEE 802.11 wireless networks operating in infrastructure mode.

An infrastructure mode network includes an Access Point (AP) and a wireless LAN terminal (STA: Station). The wireless LAN terminal is provided within a communicable range from the Access Point AP.

The IEEE 802.11e protocol classifies traffic according to required levels of QoS (into four Access Categories of traffic provided in the IEEE 802.11e: AC1 (an AC for voice traffic), AC2 (an AC for video traffic), AC3 (an AC for best-effort traffic), and AC4 (an AC for background traffic)). Then, the IEEE 802.11e protocol gives priority channel access to traffic of an Access Category with higher priority according to the EDCA (Enhanced Distributed Channel Access).

In controlling the admission, transmission of voice traffic or video traffic requiring high QoS is allowed to the loads that the network is able to support in order to guarantee the quality of allowed multimedia communications. In other words, in order to guarantee the quality of allowed traffic, voice traffic and video traffic requiring transmission through the Access Categories AC1 and AC2 are allowed to the loads that the network capacity allows. More specifically, in a network that operates in admission control mode, a STA requesting transmission of voice traffic and video traffic transmits its admission request to an AP. In response to the admission request, the AP grants the admission if it determines that the network's capacity is able to meet the traffic's QoS request, and if not, the AP rejects the admission. Voice traffic (or video traffic) whose admission has been granted is transmitted through the Access Category AC1 (or AC2).

On the other hand, transmission of voice traffic (or video traffic) whose admission has been rejected is either cancelled or transmitted through the Access Category AC3 of best-effort traffic with lower priority. As described above, the IEEE 802.11e protocol provides techniques for controlling QoS over wireless communications.

Non-patent Document 1: IEEE P802.11e/D13.0, January 2005, (Draft Amendment to ANSI/IEEE Std 802.11, 1999 Edition (Reaff 2003)), Medium Access Control (MAC) Quality of Service (QoS) Enhancements.

DISCLOSURE OF THE INVENTION

In a conventional single-cell network, all traffics are transmitted or received by the access point, which allows for the admission control by the access point. Therefore, its administration is simple.

In a multi-hop wireless network system, however, there is a problem that admission control is usually difficult. This is because, when traffic is transmitted from source to destination through a relay terminal, quality of the traffic is not affected only by conditions of the source terminal and the destination terminal but also by those of the relay terminal, channel access conditions between the relay terminals and other terminals in the same communication range, etc.

Therefore, the present invention aims to solve the aforementioned problem and one of its objects is to provide a multi-hop wireless network system allowing for the admission control.

According to the invention, a multi-hop wireless network system includes first to third radio devices and a radio controller. The first radio device is the source. The second radio device is the destination. The third radio device relays wireless communications between the first and the second radio devices. According to the characteristics of the communication path running from the first radio device to the second radio device through the third radio device, the radio controller allows or rejects a quality maintenance request requesting that the traffic, which is a stream of packets transmitted from the first radio device to the second radio device, should be transmitted with its quality maintained to a certain level. The first and the third radio devices measure the characteristics of the wireless communication path. The radio controller receives the measured characteristics of the wireless communication path and then allows or rejects the quality maintenance request based on the received characteristics of the wireless communication path. If the quality maintenance request is allowed by the radio controller, the first radio device starts to transmit the traffic to the second radio device through the third radio device.

Preferably, the radio controller is provided in the second radio device. The first and the third radio devices transmit the measured characteristics of the wireless communication path to the second radio device. The second radio device allows or rejects the quality maintenance request according to the measured characteristics of the wireless communication path.

Preferably, the first radio device measures first characteristics that are the characteristics of the wireless communication path at the first radio device itself. Then, the first radio device transmits to the third radio device a characteristics-measurement packet including the measured first characteristics and requesting characteristics measurement of the wireless communication path. Upon receiving the characteristics-measurement packet, the third radio device measures second characteristics that are the characteristics of the wireless communication path at the third radio device itself, and using the measured second characteristics, renews the first characteristics included in the characteristics-measurement packet to third characteristics. The third radio device then transmits to the second radio device the characteristics-measurement packet including the renewed third characteristics. Upon receiving the characteristics-measurement packet, the second radio device allows or rejects the quality maintenance request according to the third characteristics included in the characteristics-measurement packet.

Preferably, the first radio device transmits to the second radio device through the third radio device a decision-request packet including quality of service required by the traffic and requesting a decision whether to allow or reject the quality maintenance request. Upon receiving the decision requesting packet, the second radio device allows or rejects the quality maintenance request according to the third characteristics and transmits to the first radio device through the third radio device either of a first decision-reply packet including the allowance of the quality maintenance request and the quality required for the traffic or a second decision-reply packet including the rejection of the quality maintenance request.

Preferably, upon receiving the first decision-reply packet from the second radio device, the third radio device reserves a bandwidth that satisfies the quality required for the traffic included in the first decision-reply packet and then transmits the first decision-reply packet to the first radio device. When receiving the second decision-reply packet from the second radio device, the third radio device forwards the second decision-reply packet to the first radio device. The first radio device starts to transmit the traffic upon receiving the first decision-reply packet.

Preferably, the radio controller is provided in the third radio device. The first and the third radio devices transmit to the second radio device the measured characteristics of the wireless communication path. The third radio device allows or rejects the quality maintenance request according to the measured characteristics of the wireless communication path and then transmits to the second radio device either of the allowance or the rejection of the quality maintenance request. When receiving the rejection of the quality maintenance request from the third radio device, the second radio device transmits the rejection of the quality maintenance request to the first radio device. When receiving the allowance of the quality maintenance request from the third radio device, the second radio device allows or rejects the quality maintenance request according to the received characteristics of the wireless communication path and then transmits either of the allowance or the rejection of quality maintenance request to the first radio device through the third radio device.

Preferably, the first radio device measures first characteristics that are the characteristics of the wireless communication path at the first radio device itself and transmits to the third radio device a characteristics-measurement packet including the measured first characteristics and requesting characteristics measurement of the wireless communication path. Upon receiving the characteristics-measurement packet, the third radio device measures second characteristics that are the characteristics of the wireless communication path at the third radio device itself and, based on the measured second characteristics, renews the first characteristics included in the characteristics-measurement packet to third characteristics. The third radio device then transmits the characteristics-measurement packet including the renewed third characteristics to the second radio device. Upon receiving the characteristics-measurement packet and the allowance of the quality maintenance request, the second radio device allows or rejects the quality maintenance request according to the third characteristics included in the characteristics-measurement packet.

Preferably, the first radio device sequentially transmits to the third and the second radio devices a decision-request packet including the quality required for the traffic and requesting a decision whether to allow or reject the quality maintenance request. Upon receiving the decision-request packet, the third radio device allows or rejects the quality maintenance request according to the third characteristics and then transmits to the second radio device the decision-request packet including either of a first flag allowing the quality maintenance request or a second flag rejecting the quality maintenance request. When receiving the decision-request packet including the first flag, the second radio device allows or rejects the quality maintenance request according to the third characteristics and transmits to the first radio device through the third radio device either of a first decision-reply packet including the allowance of the quality maintenance request and the quality required for the traffic or a second decision-reply packet including the rejection of the quality maintenance request. When receiving the decision-request packet including the second flag, the second radio device transmits the second decision-reply packet to the first radio device through the third radio device.

Preferably, when receiving the first decision-reply packet from the second radio device, the third radio device reserves a bandwidth that satisfies the quality required for the traffic included in the first decision-reply packet and transmits the first decision-reply packet to the first radio device. When receiving the second decision-reply packet from the second radio device, the third radio device forwards the decision-reply packet to the first radio device. The first radio device starts to transmit the traffic upon receiving the first decision-reply packet.

Preferably, the radio controller is provided in the first radio device. The first and the third radio devices transmit the measured characteristics of the wireless communication path to the second radio device. The second radio device transmits the measured characteristics of the wireless communication path to the first radio device. The first radio device allows or rejects the quality maintenance request according to the measured characteristics of the wireless communication path and starts to transmit the traffic if the first radio device has allowed the quality maintenance request.

Preferably, the first radio device measures first characteristics that are the characteristics of the wireless communication path at the first radio device itself and transmits to the third radio device a characteristics-measurement packet including the measured first characteristics and requesting characteristics measurement of the wireless communication path. Upon receiving from the second radio device though the third radio device the characteristics-measurement packet including third characteristics that have been renewed from the first characteristics based on a second characteristics, which are the characteristics of the wireless communication path at the third radio device, the first radio device allows or rejects the quality maintenance request according to the third characteristics included in the characteristics-measurement packet. Upon receiving the characteristics-measurement packet, the third radio device measures the second characteristics that are the characteristics of the wireless communication path at the third radio device itself, renews the first characteristics included in the characteristics-measurement packet to the third characteristics based on the measured second characteristics and transmits to the second radio device the characteristics-measurement packet including the renewed third characteristics. Upon receiving the characteristics-measurement packet, the second radio device transmits the received characteristics-measurement packet to the first radio device through the third radio device.

Preferably, the radio controller is provided in a fourth radio device that is none of the first to the third radio devices. The first and the third radio devices transmit the measured characteristics of the wireless communication path to the second radio device. The second radio device transmits the measured characteristics of the wireless communication path to the fourth radio device. The fourth radio device allows or rejects the quality maintenance request according to the measured characteristics of the wireless communication path.

Preferably, the first radio device measures first characteristics that are the characteristics of the wireless communication path at the first radio device itself and transmits to the third radio device a characteristics-measurement packet including the measured first characteristics and requesting characteristics measurement of the wireless communication path. Upon receiving the characteristics-measurement packet, the third radio device measures second characteristics that are the characteristics of the wireless communication path at the third radio device itself, renews the first characteristics included in the characteristics measurement packet to third characteristics based on the measured second characteristics, and transmits to the second radio device the characteristics-measurement packet including the renewed third characteristics. Upon receiving the characteristics-measurement packet, the second radio device transmits the received characteristics-measurement packet to the fourth radio device. Upon receiving the characteristics-measurement packet, the fourth radio device allows or rejects the quality maintenance request according to the third characteristics included in the characteristics-measurement packet.

Preferably, the first radio device transmits to the fourth radio device a decision-request packet including the quality required for the traffic and requesting a decision whether to allow or reject the quality maintenance request. Upon receiving the decision-request packet, the fourth radio device allows or rejects the quality maintenance request according to the third characteristics and transmits to the first radio device either of a first decision-reply packet including the allowance of the quality maintenance request and the quality required for the traffic, or a second decision-reply packet including a rejection of the quality maintenance request.

Preferably, the first radio device starts to transmit the traffic upon receiving the first decision-reply packet from the fourth radio device.

In the multi-hop wireless network system according to the present invention, the first radio device (the source) and the third radio device (the relay terminal) measure characteristics of the wireless communication path running from the first radio device to the second radio device (the destination) through the third radio device. According to the measured characteristics of the wireless communication path, the radio controller allows or rejects the quality maintenance request requesting that the traffic should be transmitted with its quality maintained to a certain level. The first radio device as the source starts to transmit the traffic if the radio controller allows the quality maintenance request. More specifically, in the multi-hop wireless network system of the present invention, the first and the third radio devices measure the characteristics of the wireless communication path (=a path of the source–the relay terminal–the destination) that greatly affects the quality of the traffic, and the radio controller allows or rejects the quality maintenance request according to the measured characteristics of the wireless communication path.

Therefore, the present invention allows for the admission control for accepting or rejecting the quality maintenance request in the multi-hop wireless network system.

BRIEF DESCRIPTION OF THE DRAWINGS

FIG. 4 is a block diagram of a characteristics-measurement packet.

FIG. 5 is a block diagram of an admission-request packet.

FIG. 6 is a block diagram of an admission-reply packet.

BEST MODES FOR CARRYING OUT THE INVENTION

The present invention will now be described in embodiments with reference to the drawings more specifically. In the figures, identical or like components are identically denoted by the same reference numbers and explanations thereof are not repeated.

Figure 1:
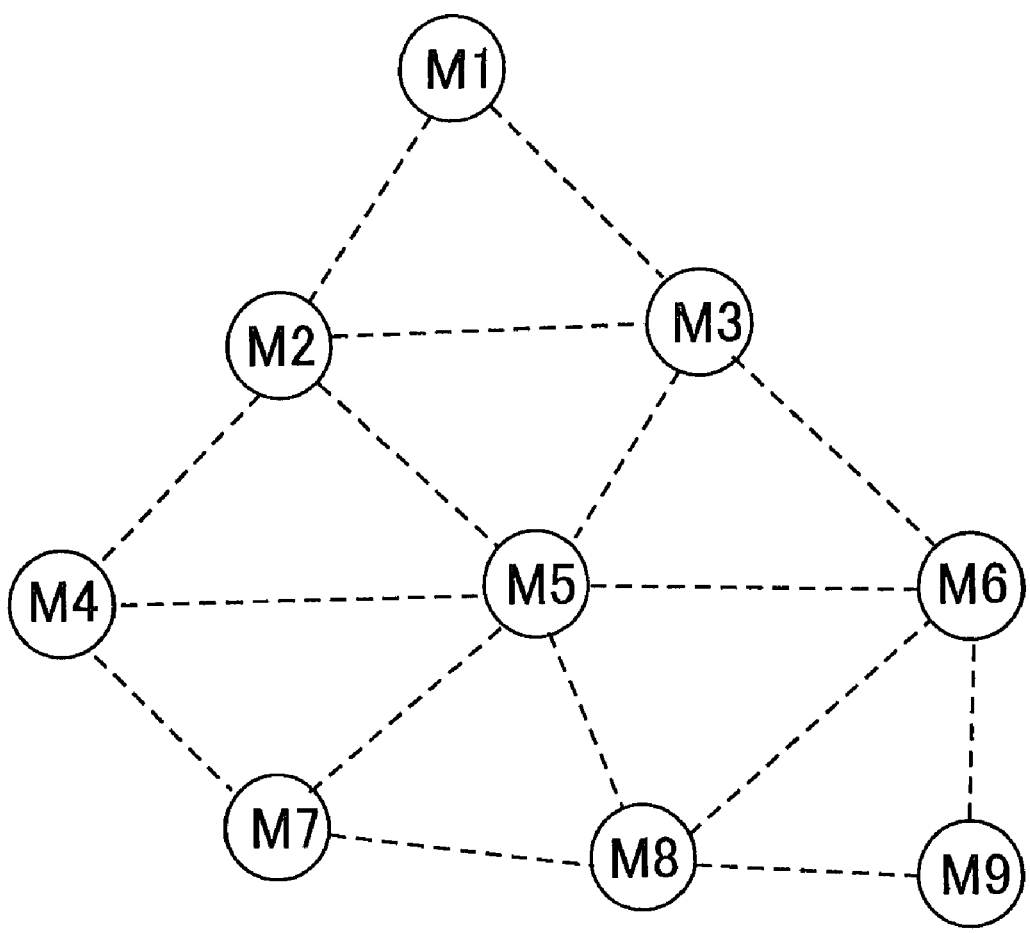
FIG. 1 is a schematic diagram of a multi-hop wireless network system in accordance with the embodiments of the present invention.

FIG. 1 is a schematic diagram of a multi-hop wireless network system 10 in accordance with the embodiments of the present invention. The multi-hop wireless network system 10 includes radio devices M1 to M9. The radio devices M1 to M9 are provided in a wireless communication space. Each of the radio devices M1 to M9 performs wireless communications with a destination terminal through other radio devices. For example, the radio device M1 wirelessly communicates with the radio device M8 through the radio devices M2 and M5, and the radio device M4 wirelessly communicates with the radio device M9 through the radio devices M7 and M8.

Figure 2:
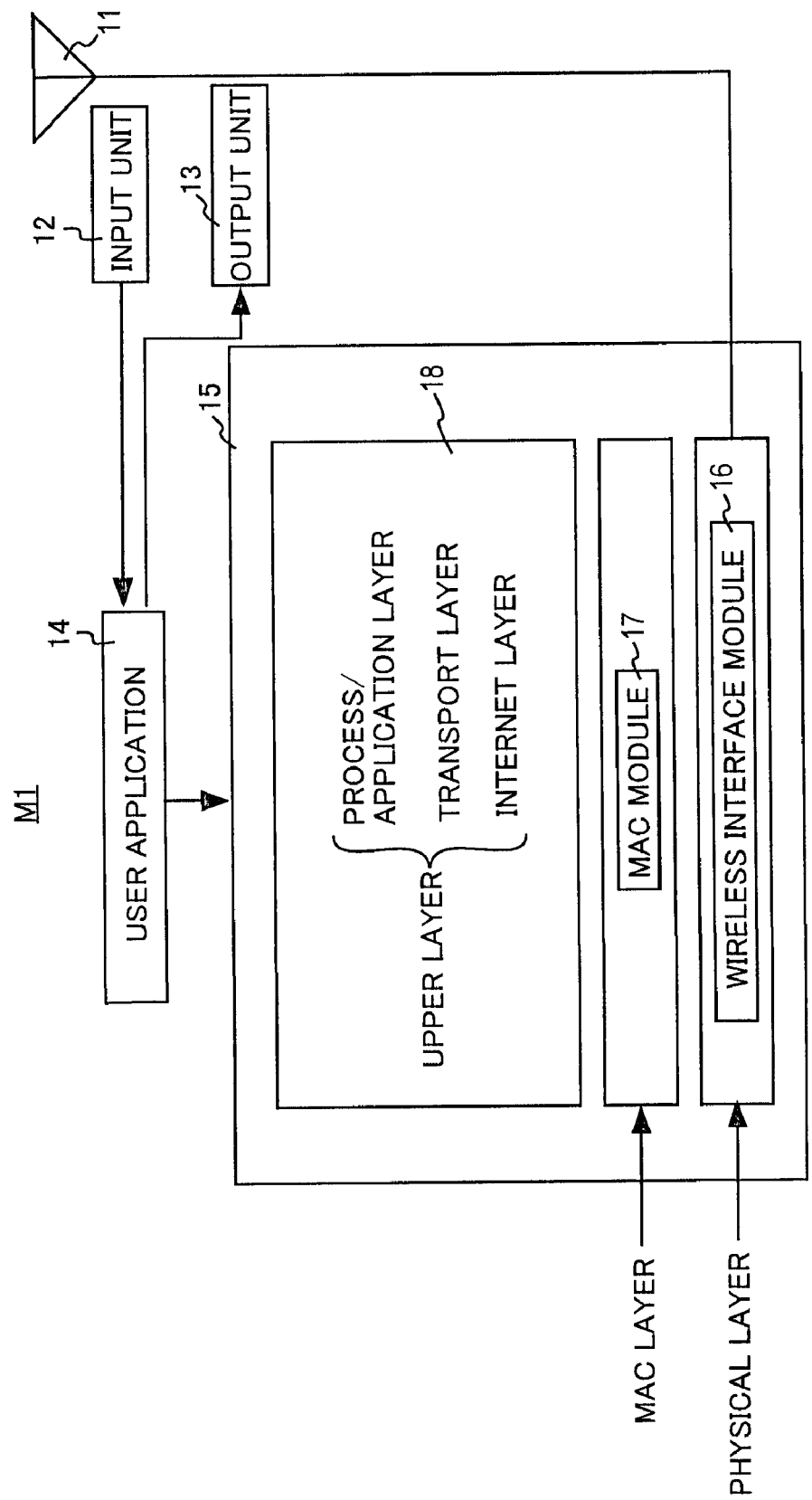
FIG. 2 is a schematic block diagram showing the structure of the radio device shown in FIG. 1.

FIG. 2 is a schematic block diagram showing the structure of the radio device M1 shown in FIG. 1. The radio device M1 includes an antenna 11, an input unit 12, an output 13, a user application 14, and a transmission control unit 15.

The antenna 11 receives data from other radio devices over a wireless communication space, outputs the received data to the transmission control unit 15, and transmits data from the transmission control unit 15 to other radio devices through the wireless communication space.

The input unit 12 receives a message and a destination of data that have been input by a user of the radio device 1. The input unit 12 outputs the received message and destination to the user application 14. The output unit 13 displays the message according to the administration by the user application 14.

The user application 14 produces data according to the message and destination received from the input unit 12 and outputs the produced data to the transmission control unit 15.

Based on the ARPA (Advanced Research Projects Agency) internet hierarchical structure, the transmission control unit 15 includes a plurality of modules controlling transmissions. More specifically, the transmission control unit 15 includes a wireless interface module 16, a MAC (Media Access Control) module 17 and an upper layer 18.

Belonging to the physical layer, the wireless interface module 16 modulates/demodulates transmitting signals or receiving signals in accordance with a prescribed regulation and transmits/receives signals through the antenna 11.

The MAC module 17, which belongs to the MAC layer, receives an IP packet from the upper layer 18 and produces a packet PKT by adding a MAC header to the received IP packet.

In transmitting the produced packet PKTs to the destination, the MAC module 17 classifies the packet PKTs into a plurality of Access Categories (ACs) based on the EDCA method and preferentially transmits a packet PKT that belongs to an Access Category AC with higher priority.

Then, in transmitting packet PKTs in each Access Category AC to the destination, the MAC module 17 transmits the packet PKTs to the destination in accordance with the admission control that is described below.

The upper layer 18 includes an internet layer, a transport layer and a process/application layer and produces an IP packet based on data received from the user application 14. The IP packet includes an IP header and an IP data unit for storing the data. Upon receiving the data from the user application 14, the upper layer 18 stores the received data into the IP data unit to produce the IP packet.

After producing the IP packet, the upper layer 18 selects a path for transmitting the produced IP packet and transmits the IP packet to the MAC module 17 so that the IP packet is sent to the destination terminal along the selected path.

In this case, the upper layer 18 selects the path to the destination terminal according to either of a table-driven protocol or an on-demand protocol.

It should be noted that each of the radio devices M2 to M9 has the same structure as the radio device M1 shown in FIG. 2.

Figure 3:
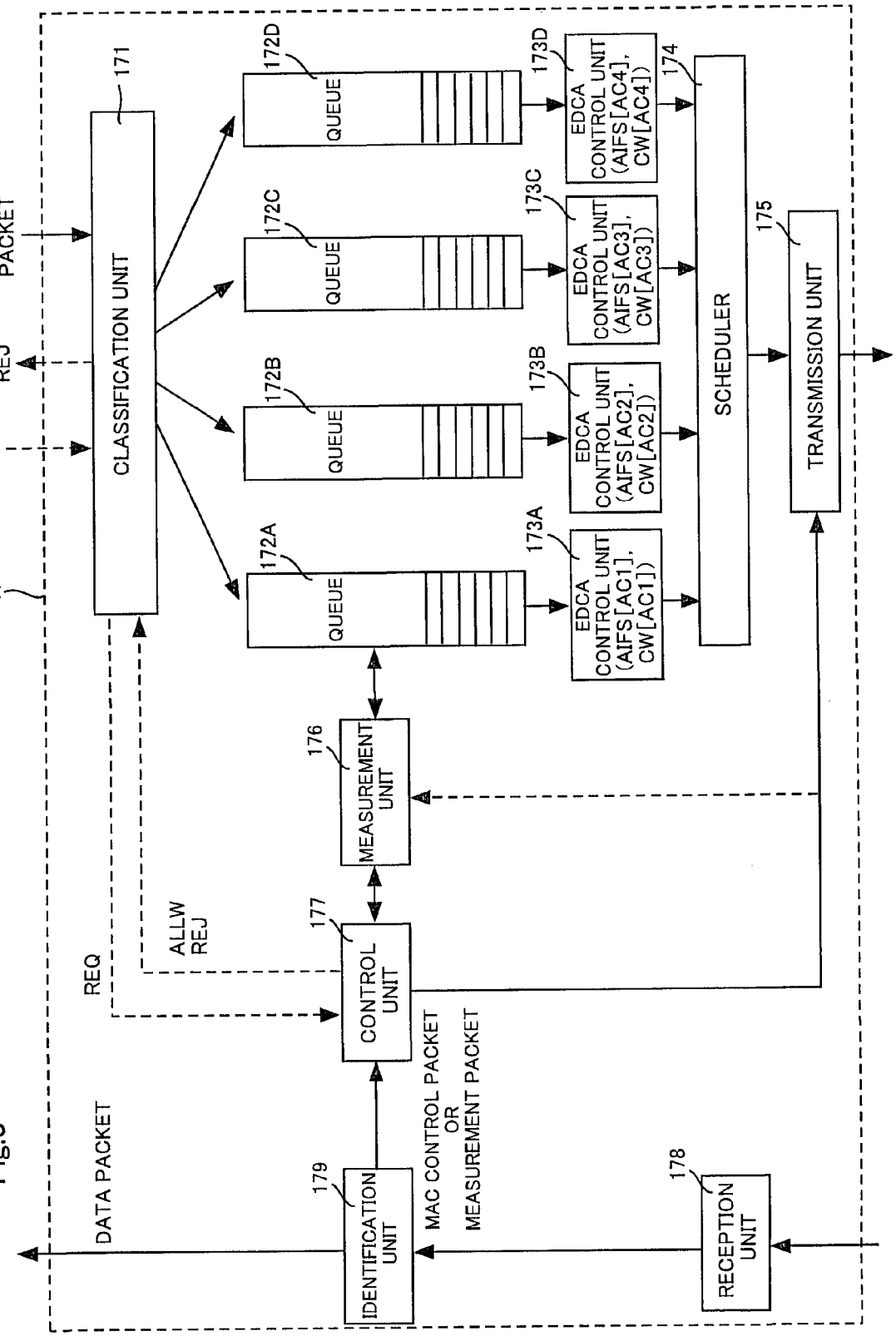
FIG. 3 is a functional block diagram of the MAC module shown in FIG. 2.

FIG. 3 is a functional block diagram of the MAC module 17 shown in FIG. 2. The MAC module 17 includes a classification unit 171, queues 172A, 172B, 172C, and 172D, EDCA control units 173A, 173B, 173C, and 173D, a scheduler 174, a transmission unit 175, a measurement unit 176, a control unit 177, a reception unit 178, and an identification unit 179.

The classification unit 171 receives an IP packet from the upper layer 18 and produces a packet PKT by adding a MAC header to the received IP packet. The classification unit 171 then classifies the produced packet PKT into the four Access Categories AC1 to AC4.

For example, if the packet PKT includes voice data, the classification unit 171 stores the packet PKT into the queue 172A, and if the packet PKT includes video data, into the queue 172B. If the packet PKT is a packet that may be transmitted on a best-effort basis, the classification unit 171 stores the packet PKT into the queue 172C, and if the packet PKT is a background packet, stores the packet PKT into the queue 172D.

The queues 172A, 172B, 172C, and 172D are provided so as to correspond with the Access Categories AC1 to AC4, respectively. The queues 172A, 172B, 172C, and 172D store packet PKTs classified by the classification unit 171 and output the stored packet PKTs to the EDCA control units 173A, 173B, 173C, and 173D, respectively, in sequential order of storage.

The EDCA control units 173A, 173B, 173C, and 173D are provided so as to correspond with the queues 172A, 172B, 172C, and 172D, respectively. The EDCA control unit 173A includes an Arbitration Inter Frame Space AIFS[AC1] and a backoff time Backoff[AC1] for backoff. The EDCA control unit 173A reads out the packet PKT stored in the queue 172A and holds the read out packet PKT after the lapse of the Arbitration Inter Frame Space AIFS[AC1] until the backoff time Backoff[AC1] is decreased to 0. Then, the EDCA control unit 173A outputs the packet PKT to the scheduler 174.

The EDCA control unit 173B has an Arbitration Inter Frame Space AIFS[AC2] and a backoff time Backoff[AC2] for backoff. The EDCA control unit 173B reads out the packet PKT stored in the queue 172B and holds the read out packet PKT after the lapse of the Arbitration Inter Frame Space AIFS[AC2] until the backoff time Backoff[AC2] is decreased to 0. Then, the EDCA control unit 173B outputs the packet PKT to the scheduler 174.

The EDCA control unit 173C has an Arbitration Inter Frame Space AIFS[AC3] and a backoff time Backoff[AC3] for backoff. The EDCA control unit 173C reads out the packet PKT stored in the queue 172C and holds the read out packet PKT after the lapse of the Arbitration Inter Frame Space AIFS[AC3] until the backoff time Backoff[AC3] is decreased to 0. After that, the EDCA control unit 173C outputs the packet PKT to the scheduler 174.

The EDCA control unit 173D has an Arbitration Inter Frame Space AIFS[AC4] and a backoff time Backoff[AC4] for backoff. The EDCA control unit 173D reads out the packet PKT stored in the queue 172D and holds the read out packet PKT after the lapse of the Arbitration Inter Frame Space AIFS[AC4] until the backoff time Backoff[AC4] is decreased to 0. After that, the EDCA control unit 173D outputs the packet PKT to the scheduler 174.

The relation between the Arbitration Inter Frame Spaces AIFS1, AIFS2, AIFS3, and AIFS4 is AIFS1<AIFS2<AIFS3<AIFS4. The backoff time Backoff[ACi] (i=1 to 4) is determined by Backoff[ACi]=Random[ACi]×aSlotTime. Here, the aSlotTime is a slot time of a fixed length and determined by the medium characteristics of the physical layer. The Random[ACi] is a uniform random number extracted with [0, CW[ACi]]. The CW[ACi] is aCWmin[ACi]≦CW[ACi]≦aCWmax[ACi].

The relation between aCWmin[AC1], aCWmin[AC2], aCWmin[AC3], and aCWmin[AC4] is aCWmin[AC1]<aCWmin[AC2]<aCWmin[AC3]<aCWmin[AC4]. The relation between aCWmax[AC1], aCWmax[AC2], aCWmax[AC3], and aCWmax[AC4] is aCWmax[AC1]<aCWmax[AC2]<aCWmax[AC3]<aCWmax[AC4].

Therefore, the EDCA control unit 173A is highly likely to read out the packet PKT from the queue 172A and output the packet PKT to the scheduler 174 with the shortest time period. The EDCA control unit 173B is highly likely to read out the packet PKT from the queue 172B and output the packet PKT to the scheduler 174 with the time period shortest next to the time period in the EDCA control unit 173A. The EDCA control unit 173C is highly likely to read out the packet PKT from the queue 172C and output to the scheduler 174 with the time period shortest next to the time period in the EDCA control unit 173B. The EDCA control unit 173D is highly likely to read out the packet PKT form the queue 172D and output the packet PKT to the scheduler 174 with the longest time period.

As a result, the classification unit 171 stores the packet in the Access Category AC1 with the highest priority into the queue 172A, the packet in the Access Category AC2 with the second highest priority into the queue 172B, the packet in the Access Category AC3 with the third highest priority into the into the queue 172C, and the packet in the Access Category AC4 with the lowest priority into the queue 172D.

After packets are output from the EDCA control units 173A to 173D, the scheduler 174 passes the output packets to the transmission unit 175. In this case, if a plurality of packets is output from the EDCA control units 173A to 173D at the same time, the scheduler 174 outputs the packet with the highest priority in the plurality of packets to the transmission unit 175.

The transmission unit 175 transmits to other radio devices the packet PKT from the scheduler 174 or the packet PKT from the control unit 177 through the wireless interface module 16 and the antenna 11.

The measurement unit 176 measures the congestion status at the queue 172A or the queue 172B in response to the request from the control unit 177 and outputs the measurement result to the control unit 177. More specifically, if the number of the packet PKTs stored from the classification unit 171 into the queue 172A is greater than the number of the packet PKTs read out from the queue 172A, the measurement unit 176 determines that the queue 172A is congested and outputs 1, which indicates that congestion has been observed at the queue 172A, to the control unit 177. If the number of the packet PKTs stored from the classification unit 171 into the queue 172A is smaller than the number of the packet PKTs read out from the queue 172A, the measurement unit 176 determines that the queue 172A is not congested and outputs 0, which indicates that no congestion has been observed at the queue 172A, to the control unit 177. Likewise, the measurement unit 176 measures the congestion status at the queue 172B and outputs the measured result to the control unit 177.

In response to the request from the control unit 177, the measurement unit 176 measures the delay time of the Access Category AC1 (voice data) by measuring the time taken in order to read out the packet PKT from the EDCA control unit 173A after the packet PKT has been stored into the queue 172A and then outputs the measured delay time to the control unit 177. Likewise, the measurement unit 176 measures the delay time of the Access Category AC2 (video data) and outputs the measured delay time to the control unit 177.

Further, the measurement unit 176 receives from the transmission unit 175 the number $N_{PKT}$ of packet PKTs transmitted to the destination radio device and receives, from the reception unit 178 through the identification unit 179 and the control unit 177, the number $N_{ACK}$ of ACK (Acknowledge) packets corresponding to the transmitted packet PKTs. In response to the request from the control unit 177, the measurement unit 176 calculates a packet delivery ratio local_delivery_ratio ($=N_{ACK}/N_{PKT}$) according to the received number $N_{PKT}$ of the packet PKTs and number $N_{ACK}$ of ACK packets and outputs the calculated packet delivery ratio local_delivery_ratio to the control unit 177.

If the MAC module 17 is provided in the source radio device, the control unit 177 produces a characteristics-measurement packet RMP, which includes the congestion status, the delay time and the packet delivery ratio local_delivery_ratio measured by the measurement unit 176, for characteristics measurement of the wireless communication path from the source to the destination. The control unit 177 then outputs the produced characteristics-measurement packet RMP to the transmission unit 175.

If the MAC module 17 is provided in the radio device that relays wireless communications from source to destination, the control unit 177 receives the characteristics-measurement packet RMP, which has been received from other radio devices, from the identification unit 179 through the control unit 177 and renews the congestion status, the delay time and the packet delivery ratio local_delivery_ratio included in the received characteristics-measurement packet RMP with the methods described below. The control unit 177 then outputs to the transmission unit 175 the characteristics-measurement packet RMP including the renewed congestion status, delay time and packet delivery ratio local_delivery_ratio.

Further, if the MAC module 17 is provided in the source radio device of multimedia traffic (voice data or video data), the control unit 177 produces an admission-request packet ADDTSrequest requesting the admission control and outputs the packet to the transmission unit 175.

Further, if the MAC module 17 is provided in the radio device judging the admission control, upon receiving the admission-request packet ADDTSrequest from the source radio device, the control unit 177 determines whether to allow or reject the admission control according to the congestion status, the delay time and the packet delivery ratio local_delivery_ratio included in the characteristics-measurement packet RMP. The control unit 177 then stores the decision into an admission-reply packet ADDTSreply and outputs the packet to the transmission unit 175.

The reception unit 178 outputs to the identification unit 179 the packet PKT received from other radio devices through the antenna 11 and the wireless interface module 16.

If the packet received from the reception unit 178 is a data packet, the identification unit 179 outputs the packet to the upper layer 18. If the packet received from the reception unit 178 is either of a MAC control packet or a measurement packet, the identification unit 179 outputs the packet to the control unit 177.

FIG. 4 is a block diagram of a characteristics-measurement packet RMP. The characteristics-measurement packet RMP includes an Element ID, a Total Length, a Measurement Type1, an Unable to Measure1, a Length1, a Measured Value1, a Measurement Type2, an Unable to Measure2, a Length2, a Measured Value2, a Measurement Type3, an Unable to Measure3, a Length3, and a Measured Value3.

The Element ID indicates that a characteristics-measurement packet RMP has been produced to measure the characteristics of the wireless communication path. The Total Length represents the total length of the characteristics-measurement packet RMP while each of the Measurement Type1 to Measurement Type3 represents the requested types of measurement.

If a radio device on the wireless communication path from source to destination is unable to measure each element, each of the Unable to Measure1 to Unable to Measure3 is set to 1. The Length1 to Length3 each represent the bit numbers of fields for storing measured values, which are provided next to the Length fields. Each of the Measured Value1 to Measured Value3 includes each measured value, respectively.

FIG. 5 is a block diagram of an admission-request packet ADDTSrequest. The admission-request packet ADDTSrequest includes a Category, an Action, a Dialog Token, an Admitted, and a TSPEC (Traffic Specification).

The Category includes 1 representing the QoS request. The Action includes 0 representing the admission-request packet ADDTSrequest. The Dialog Token is used to match operation responses with operation requests if a plurality of operation requests has been produced at the same time. The Admitted is a field of one bit indicating that the admission control is performed in the multi-hop wireless network system. The TSPEC shows the specifications of the traffic, which is a stream of packet PKTs, and clearly displays the characteristics of the traffic and the QoS request.

Major elements of the TSPEC shown in FIG. 5 are, for example, a Nominal MSDU (Mac Service Data Unit) Size, a Maximum MSDU Size, a Minimum MSDU Size, a Maximum Service Interval, an Inactivity Interval, a Service Start Time, a Minimum Data Rate, a Mean Data Rate, a Burst Size, a Delay Bound, a Minimum PHY Rate, and a Surplus Bandwidth Allowance.

The Element ID included in the TSPEC indicates that the TSPEC is the traffic's specifications. The Length included in the TSPEC is the total length of the TSPEC. The Nominal MSDU Size represents the average frame size. The Maximum MSDU Size is the maximum frame size. The Minimum MSDU Size represents the minimum frame size. The Maximum Service Interval is the length of service period.

The Inactivity Interval is the time out value of the link. The Service Start Time represents the time to start the service. The Minimum Data Rate is the minimum transfer rate. The Mean Data Rate represents the average data rate. The Maximum Burst Size is the largest burst value of the MSDU at the peak data rate. The Delay Bound represents the acceptable delay time. The Minimum PHY Rate is the minimum transfer rate at the physical layer. The Surplus Bandwidth Allowance represents the standard bandwidth ratio given in consideration with, for example, retransferring. Therefore, the TSPEC stores the traffic's characteristics and the QoS request.

FIG. 6 is a block diagram of an admission-reply packet ADDTSreply. The admission-reply packet ADDTSreply includes the Category, the Action, the Dialog Token, a Status Code, and the TSPEC.

The Category includes 1. The Action includes 1. The Status Code is used to show whether the requested operation has succeeded or failed. The Dialog Token and the TSPEC are as described above. The present invention performs, in the multi-hop wireless network system 10, the admission control without exceeding the network's capacity in order to guarantee the quality of the traffic of voice traffic or video traffic requesting transmission through the Access Category AC1 or AC2 of high priority. Specifically, in the multi-hop wireless network system 10, the source radio device measures the characteristics of the wireless communication path from the source to the destination in order to carry out wireless communication with the destination radio device through other radio devices, and performs the admission control according to the measured characteristics of the wireless communication path.

Accordingly, how to measure characteristics of the wireless communication path is hereinafter described as the admission control is carried out based on the measured characteristics.

[Characteristics Measurement of Wireless Communication Path]

The characteristics measurement of the wireless communication path is started with the characteristics-measurement packet RMP that is produced and transmitted by the source radio device.

What is described below is the characteristics measurement of the wireless communication path of the radio device M1—the radio device M2—the radio device M5—the radio M8. In this case, the radio device M1 is the source, the radio device M8 is the destination, and the radio devices M2 and M5 are relay terminals that relay wireless communications between the source and the destination.

Each of the radio devices M1, M2, M5, and M8 measures, for example, the congestion status, the delay time and the packet delivery ratio as the characteristics of the wireless communication path. When the congestion status, the delay time and the packet delivery ratio are measured as the characteristics of the wireless communication path, the requests to measure the congestion status, the delay time, and the packet delivery ratio delivery_ratio (=the end-to-end packet delivery ratio) are stored into the Measurement Type1, the Measurement Type2 and the Measurement Type3 of the characteristics-measurement packet RMP, respectively. The congestion status, the delay time and the packet delivery ratio delivery_ratio are stored into the Measured Value1, the Measured Value2 and the Measured Value3 (see FIG. 4), respectively.

In the source radio device M1, the control unit 177 controls the measurement unit 176 so that the measurement unit 176 measures the congestion status, the delay time and the packet delivery ratio local_delivery_ratio. In response to the control by the control unit 177, the measurement unit 176 measures the congestion status, the delay time and the packet delivery ratio local_delivery_ratio with the methods described above and outputs to the control unit 177 the measured congestion status, delay time and packet delivery ratio local_delivery_ratio.

After that, in the source radio device M1, the control unit 177 stores into the Element ID a symbol indicating that the characteristics-measurement packet is a packet to measure characteristics of the wireless communication path. The control unit 177 stores the requests to measure the congestion status, the delay time and the packet delivery ratio delivery_ratio into the Measurement Type1, the Measurement Type2 and the Measurement Type3, respectively. The control unit 177 stores the congestion status, delay time and packet delivery ratio local_delivery_ratio received from the measurement unit 176 into the Measured Value1, the Measured Value2 and the Measured Value3 by the control unit 177, respectively, to produce an characteristics-measurement packet RMP.

In this case, in the source radio device M1, the control unit 177 stores 1 into the Measured Value1 if the measurement unit 176 determines that the queue corresponding to the requested Access Category is congested. If the measurement unit 176 observes no congestion, the measurement unit 176 stores 0 into the Measured Value1.

In the source radio device M1, the control unit 177 produces a characteristics-measurement packet RMP and then outputs the produced characteristics-measurement packet RMP to the transmission unit 175. The transmission unit 175 transmits the characteristics-measurement packet RMP from the control unit 177 to the radio device M2 through the wireless interface module 16 and the antenna 11.

(A) Measurement of the Congestion Status at Relay Terminal 1

Figure 7:
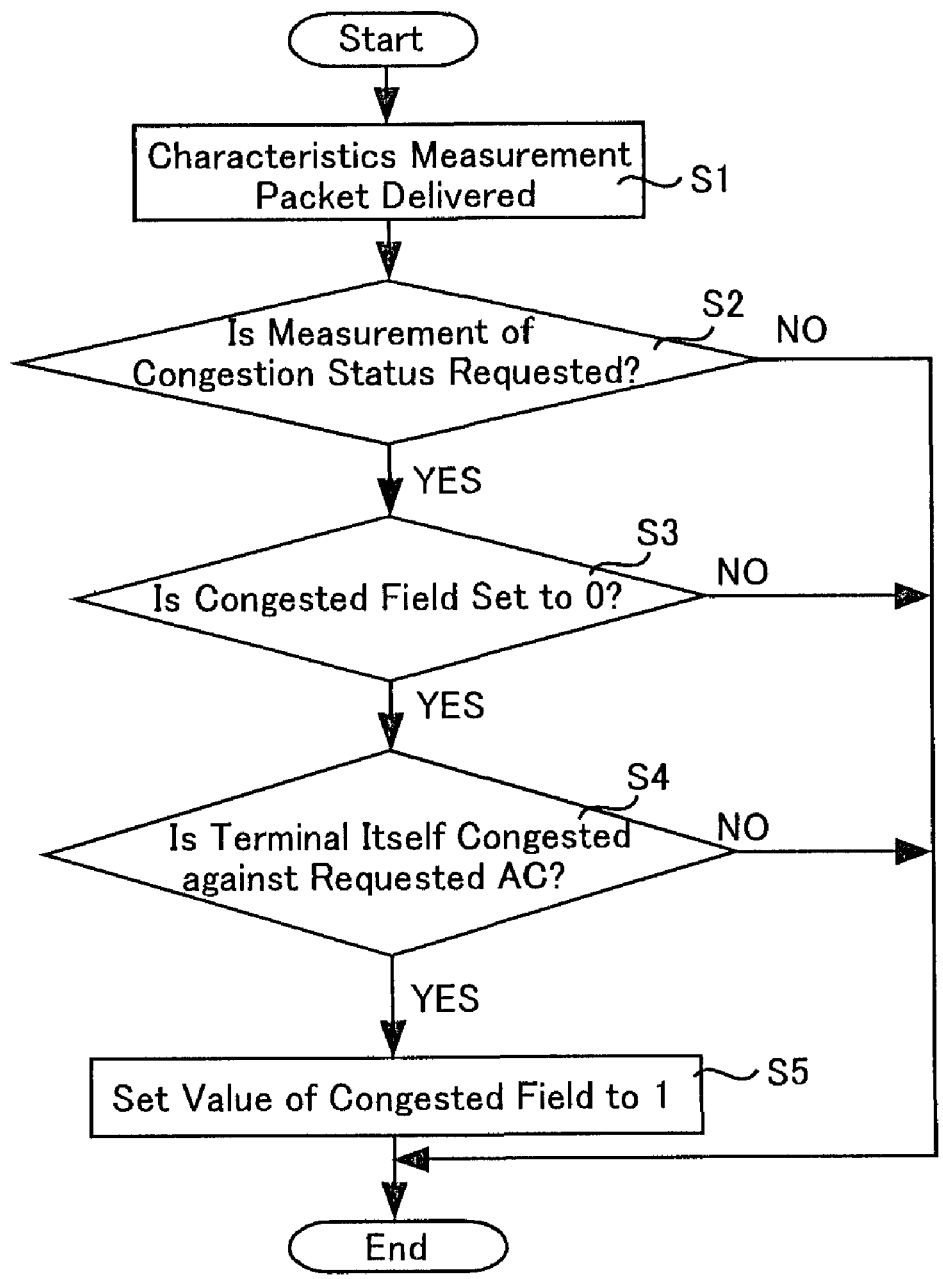
FIG. 7 is a flowchart illustrating how to measure the congestion status at the relay terminal.

FIG. 7 is a flowchart illustrating how to measure the congestion status at the relay terminal. Once the series of operation has started, the reception unit 178 in the radio device M2 receives the characteristics-measurement packet RMP from the radio device M1 through the antenna 11 and the wireless interface module 16, and outputs the received characteristics-measurement packet RMP to the control unit 177 through the identification unit 179.

In the radio device M2, the control unit 177 receives characteristics-measurement packet RMP from the reception unit 178. In this way, the characteristics-measurement packet RMP is delivered (step S1).

In the radio device M2, the control unit 177 detects, with reference to the Element ID of the characteristics-measurement packet RMP, that characteristics measurement of the wireless communication path is requested and determines whether measurement of the congestion status is requested or not with reference to the Measurement Type1 of the characteristics-measurement packet RMP (step S2).

In step S2, if it is determined that measurement of the congestion status is not requested, the series of operation ends. On the other hand, in step S2, if it is determined that measurement of the congestion status is requested, the control unit 177 of the radio device M2 further determines whether the value in the Measured Value1 (=the Congested field) of the characteristics-measurement packet RMP is 0 or not (step S3).

In step S3, if it is determined that the value in the Measured Value1 (=the Congested field) is not 0, the series of operation ends.

On the other hand, in step S3, if it is determined that the value in the Measured Value1 (=the Congested field) is 0, the control unit 177 in the radio device M2 controls the measurement unit 176 so that the congestion status at the corresponding Access Category (for example, the Access Category AC1) is measured by the measurement unit 176.

Then, the measurement unit 176 of the radio device M2 measures the congestion status of the Access Category AC1 with the methods described above and outputs the measurement result to the control unit 177. The control unit 177 of the radio device M2 determines whether the radio device M2 itself is congested against the requested Access Category AC1 according to the measurement result received from the measurement unit 176 (step S4).

More specifically, if the control unit 177 of the radio device M2 receives 1 representing congestion from the measurement unit 176, the control unit 177 determines that the radio device M2 itself is congested against the requested Access Category AC1. If the control unit 177 of the radio device M2 receives 0 indicating that there is no congestion, from the measurement unit 176, the control unit 177 determines that the radio device M2 itself is not congested against the requested Access Category AC1.

In step S4, if it is determined that the radio device M2 itself is not congested against the requested Access Category AC1, the series of operation ends. On the other hand, in step S4, if it is determined that the radio device M2 itself is congested against the requested Access Category AC1, the control unit 177 of the radio device M2 sets the value in the Measured Value1 (=the Congested field) to 1 (step S5). In this way, the series of operation ends.

In step S3, when the value in the Measured Value1 (=the Congested field) is not 0, the series of operation ends. This is because, in this case, the value in the Measured Value1 (=the Congested field) is set to 1 and it is no longer necessary to determine whether the requested Access Category AC1 in the radio device M2 is congested or not since the corresponding Access Category AC1 in the source radio device M1 is already congested. That is to say, in the present invention, if at least one radio device among the plurality of the radio devices M1, M2, M5, and M8 on the wireless communication path from the source to the destination is determined to be congested, the characteristics of the wireless communication path is considered as congested.

In step S4, when it is determined that the radio device M2 itself is not congested against the requested Access Category AC1, the series of operation ends. This is because step S4 is executed when the radio device M1 is determined not to be congested, and therefore, there is no need of renewing the Measured Value 1 (=the Congested field) of the characteristics-measurement packet RMP even if the radio device M2 is determined not to be congested.

As described above, the control unit 177 of the relay radio device M2 renews the Measured Value1 (=the Congested field) of the characteristics-measurement packet RMP in consideration of the result on the congestion measurement at the radio device M2 itself.

It should be noted that the relay radio device M5 also renews the Measured Value 1 (=the Congested field) of the characteristics-measurement packet RMP according to the flowchart shown in FIG. 7.

(B) Measurement of Delay Time at Relay Terminal

Figure 8:
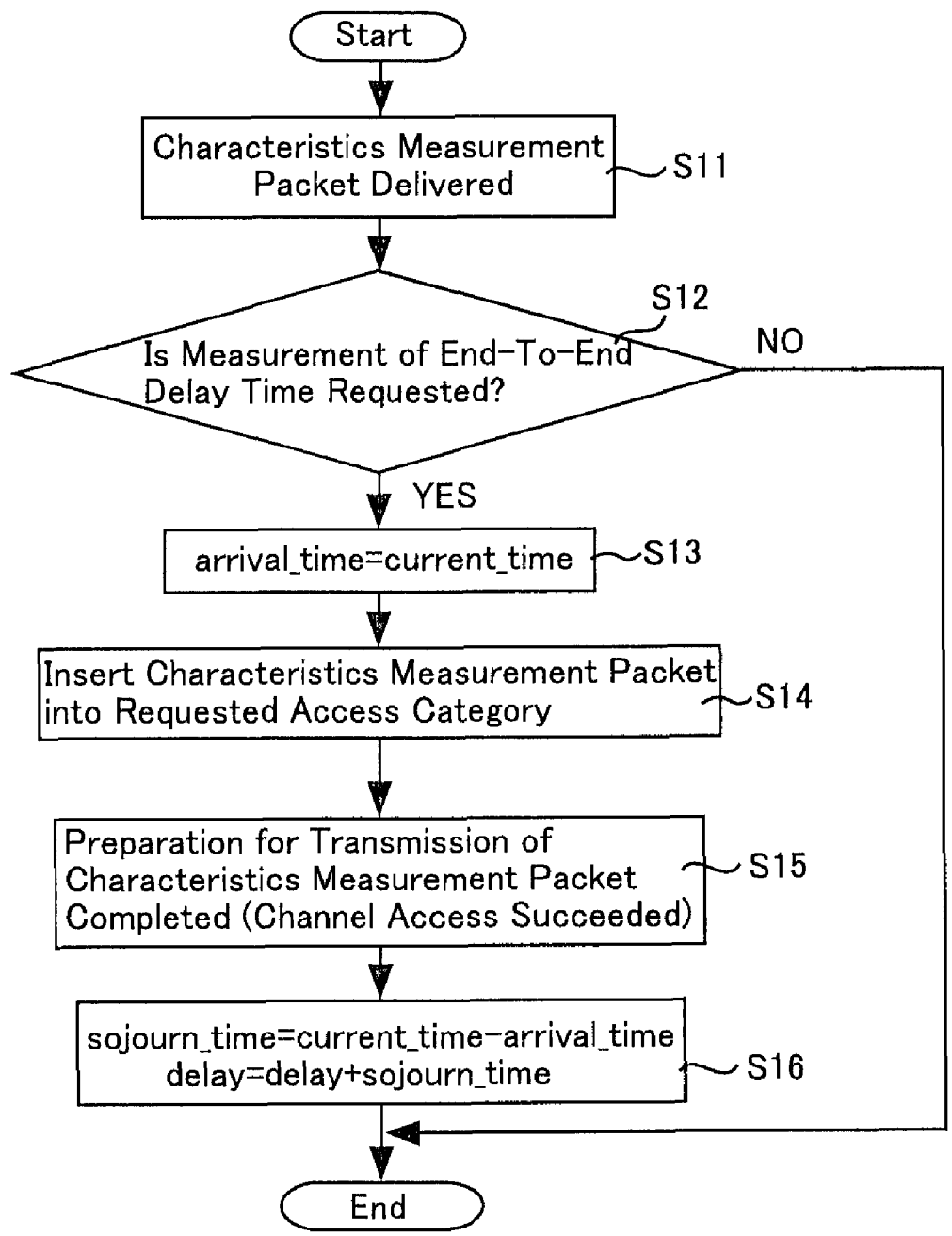
FIG. 8 is a flowchart illustrating how to measure the delay time at the relay terminal.

FIG. 8 is a flowchart illustrating how to measure the delay time at the relay terminal. Once the series of operation has started, the reception unit 178 of the radio device M2 receives a characteristics-measurement packet RMP from the radio device M1 through the antenna 11 and the wireless interface module 16 and outputs the received characteristics-measurement packet RMP to the control unit 177 through the identification unit 179.

In the radio device M2, the control unit 177 receives the characteristics-measurement packet RMP from the reception unit 178. In this way, the characteristics-measurement packet RMP is delivered (step S11).

Then, in the radio device M2, the control unit 177 detects, with reference to the Element ID of the characteristics-measurement packet RMP, that characteristics measurement of the wireless communication path is requested and determines whether the measurement of the end-to-end delay time is requested or not with reference to the Measurement Type2 of the characteristics-measurement packet RMP (step S12).

In step S12, if it is determined that the measurement of the end-to-end delay time is not requested, the series of operation ends. On the other hand, in step S12, if it is determined that the measurement of the end-to-end delay time is requested, the control unit 177 of the radio device M2 controls the measurement unit 176 so that the delay time of the requested Access Category AC1 in the radio device M2 is measured by the measurement unit 176.

Then, the measurement unit 176 of the radio device M2 sets the arrival time arrival_time of the characteristics-measurement packet RMP to the current time current_time in accordance with the administration by the control unit 177 (step S13).

After that, the control unit 177 of the radio device M2 outputs the characteristics-measurement packet RMP to the classification unit 171. The classification unit 171 stores the characteristics-measurement packet RMP received from the control unit 177 into the buffer (=the queue 172A) of the requested Access Category AC1 (step S14). The buffer (=the queue 172A) of the radio device M2 then outputs the stored characteristics-measurement packet RMP to the EDCA control unit 173A. The EDCA control unit holds the characteristics-measurement packet RMP received from the buffer (=the queue 172A) after the lapse of the Arbitration Inter Frame Space AIFS[AC1] until the backoff time Backoff[AC1] is decreased to 0. After that, the characteristics-measurement packet RMP received from the buffer (=the queue 172A) is output to the scheduler 174 by the EDCA control unit.

The scheduler 174 outputs to the transmission unit 175 the characteristics-measurement packet RMP received from the EDCA control unit 173A. In this way, preparation to transmit the characteristics-measurement packet RMP is completed (step S15).

Upon receiving the characteristics-measurement packet RMP from the scheduler 174, the transmission unit 175 of the radio device M2 outputs to the measurement unit 176 a notice indicating that the characteristics-measurement packet RMP has been received.

Then, the measurement unit 176 of the radio device M2 sets the current time current_time to the time when the notice indicating the reception of the characteristics-measurement packet RMP has been received from the transmission unit 175 and calculates the delay time sojourn (=current_time−arrival_time) at the radio device M2 by subtracting the arrival time arrival_time from the current time current_time. After that, the measurement unit 176 of the radio device M2 outputs the calculated delay time sojourn to the control unit 177.

Upon receiving the delay time sojourn from the measurement unit 176, the control unit 177 of the radio device M2 reads out the end-to-end delay time delay stored in the Measured Value2 of the characteristics-measurement packet RMP and renews the end-to-end delay time delay by adding the delay time sojourn received from the measurement unit 176 to the end-to-end delay time delay (step S16).

After renewing the end-to-end delay time delay, the control unit 177 of the radio device M2 stores the renewed end-to-end delay time delay into the Measured Value2 of the characteristics-measurement packet RMP to renew the characteristics-measurement packet RMP. In this way, the series of operation ends.

As described above, the radio device M2 as the relay terminal renews the end-to-end delay time delay by adding the delay time sojourn at the radio device M2 itself to the delay time delay from the source radio device M1 to the radio device M2.

It should be noted that the radio device M5 as the relay terminal also measures the delay time sojourn at the radio device M5 itself according to the flowchart shown in FIG. 8 and renews the end-to-end delay time delay with the measured delay time sojourn.

(C) Measurement of Packet Delivery Ratio at Relay Terminal

Figure 9:
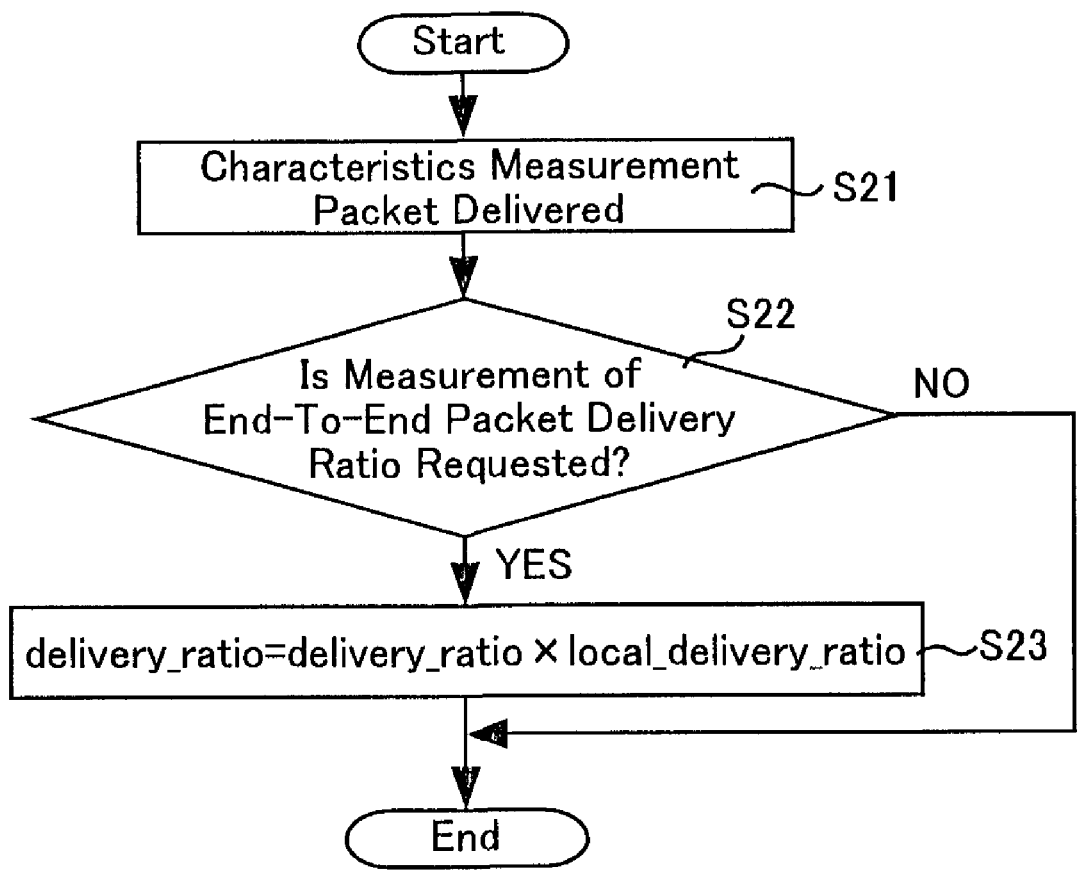
FIG. 9 is a flowchart illustrating how to measure the packet delivery ratio at the relay terminal.

FIG. 9 is a flowchart illustrating how to measure the packet delivery ratio delivery_ratio at the relay terminal. Once the series of operation has started, the reception unit 178 of the radio device M2 receives the characteristics-measurement packet RMP from the radio device M1 through the antenna 11 and the wireless interface module 16 and outputs the received characteristics-measurement packet RMP to the control unit 177 through the identification unit 179.

In the radio device M2, the control unit 177 receives the characteristics-measurement packet RMP from the reception unit 178. In this way, the characteristics-measurement packet RMP is delivered (step S21).

In the radio device M2, the control unit 177 detects, with reference to the Element ID of the characteristics-measurement packet RMP, that characteristics measurement of the wireless communication path is requested and determines whether measurement of the packet delivery ratio delivery_ratio is requested or not, with reference to the Measurement Type3 of the characteristics-measurement packet RMP (step S22).

In step S22, if it is determined that the measurement of the packet delivery ratio delivery_ratio is not requested, the series of operation ends. On the other hand, in step S22, if it is determined that the measurement of the packet delivery ratio delivery_ratio is requested, the measurement unit 176 is controlled to measure the packet delivery ratio local_delivery_ratio at the radio device M2.

Then, the measurement unit 176 of the radio device M2 measures the packet delivery ratio local_delivery_ratio at the radio device M2 with the methods described above and outputs the measured packet delivery ratio local_delivery_ratio to the control unit 177.

Upon receiving the packet delivery ratio local_delivery_ratio from the measurement unit 176, the control unit 177 of the radio device M2 reads out the packet delivery ratio delivery_ratio stored in the Measured Value3 of the characteristics-measurement packet RMP and multiplies the read out packet delivery ratio delivery_ratio by the packet delivery ratio local_delivery_ratio to renew the packet delivery ratio delivery_ratio stored in the characteristics-measurement packet RMP (step S23).

Then, the control unit 177 of the radio device M2 renews the characteristics-measurement packet RMP by storing the renewed packet delivery ratio delivery_ratio into the Measured Value3 of the characteristics-measurement packet RMP. In this way, the series of operation ends.

As described above, the radio device M2 as the relay terminal renews the packet delivery ratio delivery_ratio of the wireless communication path by multiplying the packet delivery ratio delivery_ratio from the source radio device M1 to the radio device M2 by the packet delivery ratio local_delivery_ratio at the radio device M2 itself.

It should be noted that the radio device M5 also measures the packet delivery ratio local_delivery_ratio at the radio device M5 itself according to the flowchart shown in FIG. 9 and renews the packet delivery ratio delivery_ratio of the wireless communication path with the measured packet delivery ratio local_delivery_ratio.

The control unit 177 of the radio device M2 as the relay terminal renews the characteristics-measurement packet RMP with the operation described above and then outputs the renewed characteristics-measurement packet RMP to the transmission unit 175. The transmission unit 175 transmits the characteristics-measurement packet RMP received from the control unit 177 to the radio device M5. The control unit 177 of the radio device M5 as the relay terminal renews the characteristics-measurement packet RMP with the operation described above and then outputs the renewed characteristics-measurement packet RMP to the transmission unit 175. The transmission unit 175 transmits the characteristics-measurement packet RMP received from the control unit 177 to the radio device M8 of the destination. In this way, the measured characteristics (=the congestion status, the delay time and the packet delivery ratio delivery_ratio) are sent to the radio device M8 of the destination.

[Specific Examples of Characteristics Measurement of Wireless Communication Path]

Figure 10:
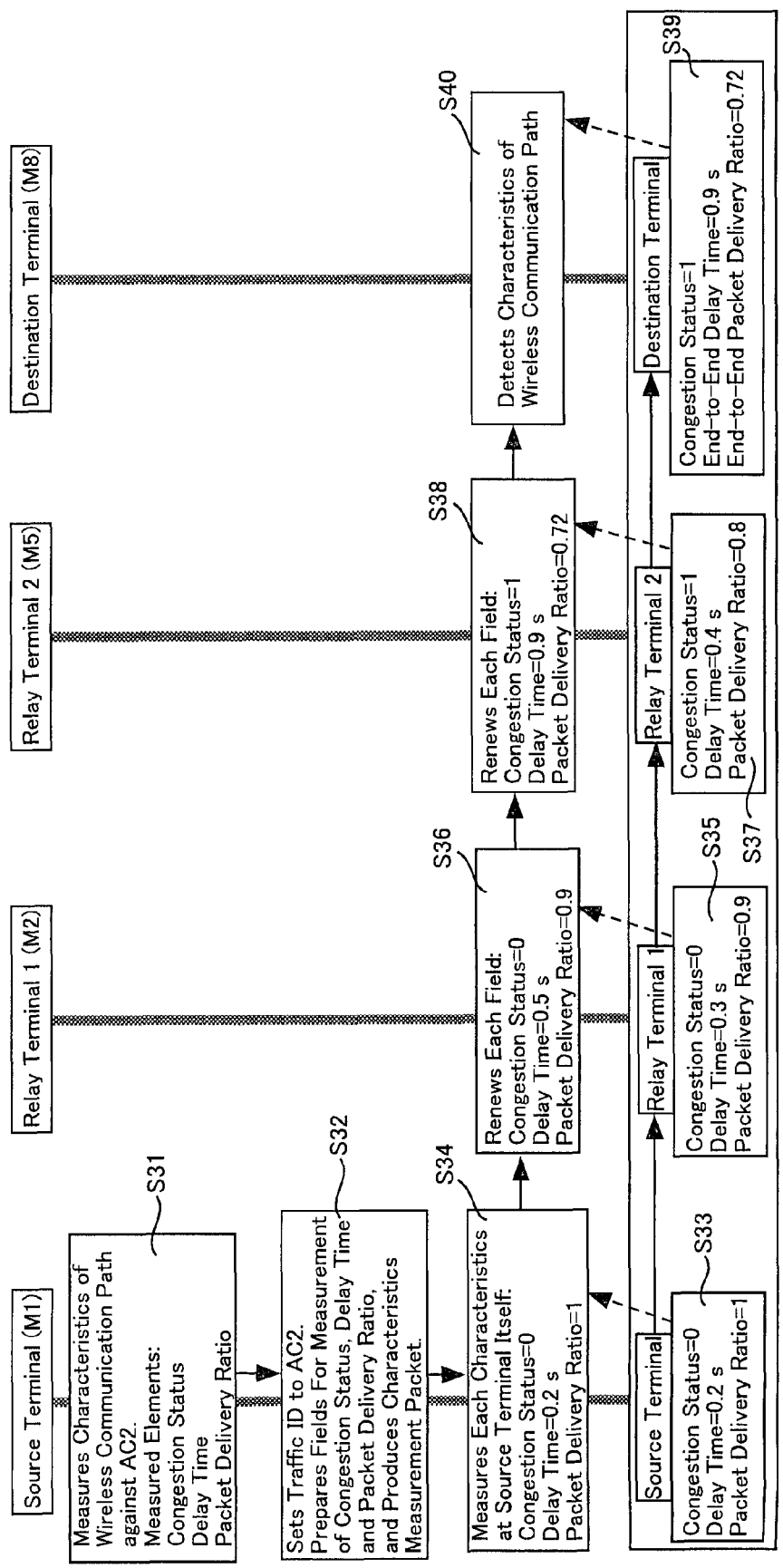
FIG. 10 is a diagram showing a specific example of characteristics measurement of the wireless communication path.

FIG. 10 is a diagram showing a specific example of the characteristics measurement of wireless communication path. Once the series of operation has started, the source terminal (=the radio device M1, as it is referred to hereinafter) determines the congestion status, the delay time and the packet delivery ratio delivery_ratio as the measurement elements to measure the characteristics of the wireless communication path for the Access Category AC2 (step S1).

Then, the source terminal sets fields (fields of Measurement Type1 to Measured Value3) for measurement of each of the congestion status, the delay time and the packet delivery ratio delivery_ratio and produces a characteristics-measurement packet RMP (step S32).

After that, the source terminal measures the congestion status=0, the delay time=0.2 s, and the packet delivery ratio=1 at the source terminal itself with the methods described above (step S33), and stores the measured congestion status=0, delay time=0.2 s, and packet delivery ratio=1 at the source terminal itself into the corresponding field of the characteristics-measurement packet RMP and then transmits the characteristics-measurement packet RMP to the relay terminal 1 (=the radio device M2, as it is referred to hereinafter) (step S34).

Upon receiving the characteristics-measurement packet RMP from the source terminal, the relay terminal 1 measures the congestion status=0, the delay time=0.3 s, and the packet delivery ratio=0.9 at the relay terminal 1 itself with the methods described above (step S35) and respectively renews the congestion status=0, the delay time=0.2 s, and the packet delivery ratio=1 stored in the characteristics-measurement packet RMP received from the source terminal using the measured congestion status=0, delay time=0.3 s, and packet delivery ratio=0.9.

More specifically, the relay terminal 1 renews the congestion status=0 stored in the characteristics-measurement packet RMP received from the source terminal using the congestion status=0 at the relay terminal 1 itself. The delay time=0.2 s stored in the characteristics-measurement packet RMP received from the source terminal is renewed to the delay time=0.5 s (=0.2 s+0.3 s) using the delay time 0.3 s at the relay terminal itself. The packet delivery ratio=1 stored in the characteristics-measurement packet RMP received from the source terminal is renewed to the packet delivery ratio=0.9 using the packet delivery ratio=0.9 (=1×0.9) at the relay terminal 1 itself.

The relay terminal 1 stores the renewed congestion status=0, delay time=0.5 s, and packet delivery ratio=0.9 into the corresponding field of the characteristics-measurement packet RMP and transmits to the relay terminal 2 (=the radio device M5, as it is referred to hereinafter) (step S36).

Upon receiving the characteristics-measurement packet RMP from the relay terminal 1, the relay terminal 2 measures the congestion status=1, the delay time=0.4 s and the packet delivery ratio=0.8 at the relay terminal 2 itself with the above-described methods (step S37) and renews the congestion status=0, the delay time=0.5 s and the packet delivery ratio=0.9 stored in the characteristics-measurement packet RMP received from the relay terminal 1 using the measured congestion status=1, delay time=0.4 s and packet delivery ratio=0.8, respectively.

More specifically, the relay terminal 2 renews the congestion status=0 stored in the characteristics-measurement packet RMP received from the relay terminal 1 to the congestion status=1 using the congestion status=1 at the relay terminal 2 itself. The delay time=0.5 s stored in the characteristics-measurement packet RMP received from the relay terminal 1 is renewed, using the delay time=0.4 s at the relay terminal 2 itself, to the delay time=0.9 s (=0.5 s+0.4 s). The packet delivery ratio=0.9 stored in the characteristics-measurement packet RMP received from the relay terminal 1 is renewed with the packet delivery ratio=0.8 at the relay terminal 2 itself to the packet delivery ratio=0.72 (=0.9×0.8).

Then, the relay terminal 2 stores the renewed congestion status=1, delay time=0.9 s and packet delivery ratio=0.72 into the corresponding field of the characteristics-measurement packet RMP and transmits the packet to the destination terminal (=the radio device M8, as it is referred to hereinafter) (step S38).

Then, the destination terminal receives the characteristics-measurement packet RMP from the relay terminal 2 (step S39) and reads out the congestion=1, the delay time=0.9 s and the packet delivery ratio=0.72 from the received characteristics-measurement packet RMP to detect the characteristics of the wireless communication path, which are the congestion=1, the end-to-end delay time=0.9 s and the end-to-end packet delivery ratio=0.72 (step S40).

As describe above, the characteristics measurement of the wireless communication path from the source to the destination is started by producing and transmitting the characteristics-measurement packet RMP in the source terminal and the measured characteristics are eventually transmitted to the destination terminal.

With this invention, the admission control is carried out according to the characteristics of the wireless communication path measured with the above-described methods. The radio device performing the admission control is any one of the destination terminal, the relay terminal, the source terminal and the centralized control terminal.

Described below are the cases where each of the destination terminal, the relay terminal, the source terminal, and the centralized control terminal performs the admission control.

Embodiment 1

In Embodiment 1, the case where the destination terminal carries out the admission control is described.

Figure 11:
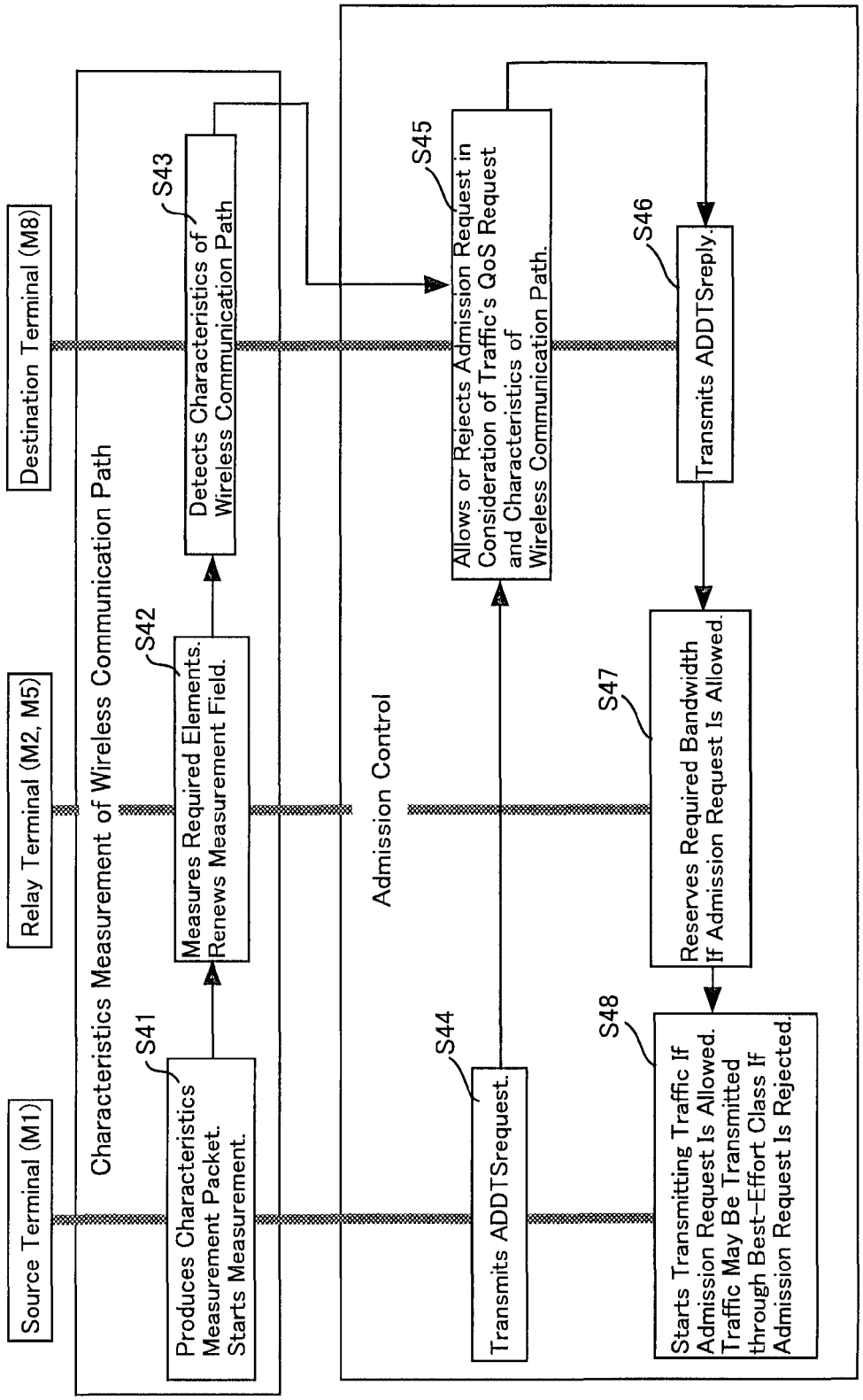
FIG. 11 is a flowchart illustrating how the destination terminal performs the admission control.

FIG. 11 is a flowchart illustrating how the destination terminal performs the admission control. The upper layer 18 of the source terminal outputs to the classification unit 171 a newly produced quality maintenance request signal REQ for multimedia traffic (voice or image). The series of operation starts when the classification unit 171 notifies the control unit 177 that the signal REQ has been output. Once the series of operation has started, the source terminal produces a characteristics-measurement packet RMP with the above-described methods and measures the characteristics of the wireless communication path at the source terminal itself. The measured characteristics of the wireless communication path are stored into the characteristics-measurement packet RMP and transmitted to the relay terminal by the source terminal (step S41).

Upon receiving the characteristics-measurement packet RMP from the source terminal, the relay terminal measures the required elements (the congestion status, the delay time and the packet delivery ratio), renews each field with the measured required elements (the congestion status, the delay time and the packet delivery ratio) and then transmits the renewed elements to the destination terminal (step S42).

Upon receiving the characteristics-measurement packet RMP from the relay terminal, the destination terminal reads out the elements (the congestion status, the delay time and the packet delivery ratio) stored in the characteristics-measurement packet RMP to detect the characteristics of the wireless communication path (step S43).

After that, the control unit 177 of the source terminal produces an admission-request packet ADDTSrequest clearly indicating the traffic characteristics and the QoS request and transmits the produced admission-request packet ADDTSrequest to the transmission unit 175. The transmission unit 175 transmits the admission-request packet ADDTSrequest received from the control unit 177 to the destination terminal through the wireless interface module 16 and the antenna 11 (step S44).

The reception unit 178 of the destination terminal receives the admission-request packet ADDTSrequest from the source terminal through the antenna 11 and the wireless interface module 16 and outputs the received admission-request packet ADDTSrequest to the control unit 177 through the identification unit 179. Upon receiving the admission-request packet ADDTSrequest, the control unit 177 of the destination terminal reads out the traffic's QoS request from the admission-request packet ADDTSrequest and allows or rejects the traffic's QoS request by determining whether the characteristics of the wireless communication path received in step S43 meet the traffic's QoS request or not. That is to say, the control unit 177 of the destination terminal allows or rejects the admission request in consideration of the traffic's QoS request and the characteristics of the wireless communication path (step S45).

After allowing or rejecting the admission request, the control unit 177 of the destination terminal stores the allowance or the rejection into the Status Code (see FIG. 6) to produce an admission-reply packet ADDTSreply, and outputs the produced admission-reply packet ADDTSreply to the transmission unit 175. The transmission unit 175 transmits the admission-reply packet ADDTSreply received from the control unit 177 to the relay terminal (=the radio devices M2 and M5, as they are referred to hereinafter) through the wireless interface module 16 and the antenna 11 (step S46).

The reception unit 178 of the relay terminal receives the admission-reply packet ADDTSreply from the destination terminal through the antenna 11 and the wireless interface module 16, and outputs the received admission-reply packet ADDTSreply to the control unit 177 through the identification unit 179.

Upon receiving the admission-reply packet ADDTSreply from the reception unit 178, the control unit 177 of the relay terminal determines whether the admission request has been allowed or rejected with reference to the Status Code of the admission-reply packet ADDTSreply. Then, if the allowance of the admission request is stored in the Status Code of the admission-reply packet ADDTSreply, the control unit 177 of the relay terminal determines that the admission request has been allowed and reserves a bandwidth meeting the traffic's QoS request requested by the source terminal. The control unit 177 of the relay terminal outputs the admission-reply packet ADDTSreply to the transmission unit 175. The transmission unit 175 transmits the admission-reply packet ADDTSreply to the source terminal through the wireless interface module 16 and the antenna 11 (step S47).

Then, the reception unit 178 of the source terminal receives the admission-reply packet ADDTSreply from the relay terminal and outputs the received admission-reply packet ADDTSreply to the control unit 177 through the identification unit 179.

Upon receiving the admission-reply packet ADDTSreply from the reception unit 178, the control unit 177 of the source terminal determines whether the admission request has been allowed or rejected with reference to the Status Code of the received admission-reply packet ADDTSreply. Then, if the allowance of the admission request is stored in the Status Code of the admission-reply packet ADDTSreply, the control unit 177 of the source terminal determines that the admission request has been allowed, produces an allowance signal ALLW and outputs the signal to the classification unit 171.

In response to the allowance signal ALLW from the control unit 177, the classification unit 171 of the source terminal notifies the upper layer 18 that the admission control for the traffic has been allowed and stores the packet PKT of the traffic into the queue of the corresponding Access Category with higher priority. More specifically, if the allowance of the admission request is stored in the Status Code of the admission-reply packet ADDTSreply, the source terminal starts to transmit the traffic through the corresponding Access Category with higher priority (step S48).

On the other hand, if the rejection of the admission request is stored in the Status Code of the admission-reply packet ADDTSreply, the control unit 177 of the source terminal determines that the admission request has been rejected, produces a rejection signal REJ and outputs the signal to the classification unit 171. In response to the rejection signal REJ from the control unit 177, the classification unit 171 of the source terminal notifies the upper layer 18 that the admission control for the traffic has been rejected and rejects storing the packet PKT into the buffer for the Access Category with higher priority.

It should be noted that the control unit 177 of the source terminal may start to transmit the traffic through the best effort class even if the rejection of the admission request is stored in the Status Code of the admission-reply packet ADDTSreply.

In this way, the series of operation where the destination terminal performs the admission control ends.

As described above, in Embodiment 1, in the multi-hop wireless network system including the source terminal, the relay terminal and the destination terminal, the source terminal and the relay terminal measure characteristics of the wireless communication path and transmit the characteristics to the destination terminal. The destination terminal allows or rejects the traffic's QoS request from the source terminal (=the admission control) according to the received characteristics of the wireless communication path.

Therefore, according to Embodiment 1, the admission control is easily performed even in the multi-hop wireless network system.

It should be noted that the source terminal may transmit the characteristics-measurement packet RMP and the admission-request packet ADDTSrequest at the same time. In this case, the admission-request packet ADDTSrequest is included in the characteristics-measurement packet RMP to be transmitted.

In the destination terminal, the control unit 177 allowing or rejecting the admission request in response to the admission-request packet ADDTSrequest forms a radio controller.

Embodiment 2

In Embodiment 2, the case where the relay terminal performs the admission control is described.

Figure 12:
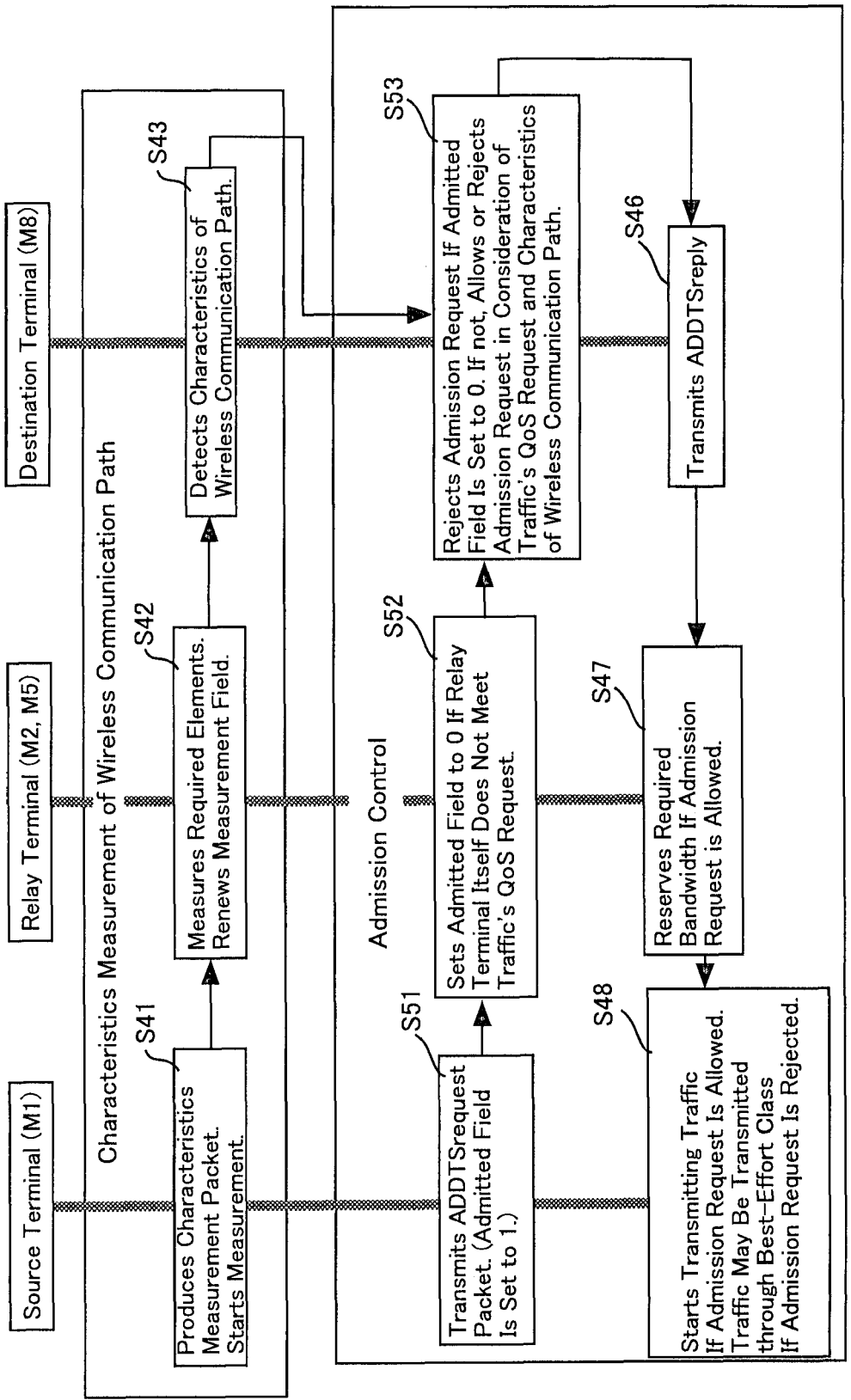
FIG. 12 is a flowchart illustrating how the relay terminal performs the admission control.

FIG. 12 is a flowchart illustrating how the relay terminal performs the admission control. The flowchart shown in FIG. 12 is identical with the flowchart shown in FIG. 11 except that steps S44 and S45 in the flowchart of FIG. 11 are replaced with steps S51 to S53.

As described above, once the series of operation has started, the source terminal and the relay terminal measure characteristics of the wireless communication path from the source terminal to the destination terminal and transmit a characteristics-measurement packet RMP including the measured characteristics of the wireless communication path to the destination terminal. The destination terminal receives the characteristics-measurement packet RMP and detects the characteristics of the wireless communication path from the source terminal to the destination terminal (steps S41 to S43).

After that, the control unit 177 of the source terminal sets the Admitted field to 1 and produces an admission-request packet ADDTSrequest clearly indicating the traffic's characteristics and the QoS request. Then, the control unit 177 of the source terminal outputs the produced admission-request packet ADDTSrequest to the transmission unit 175. The transmission unit 175 transmits the admission-request packet ADDTSrequest received from the control unit 177 to the relay terminal through the wireless interface module 16 and the antenna 11 (step S51).

The reception unit 178 of the relay terminal receives the admission-request packet ADDTDrequest from the source terminal through the antenna 11 and the wireless interface module 16, and outputs the received admission-request packet ADDTDrequest to the control unit 177 through the identification unit 179.

Upon receiving the admission-request packet ADDTDrequest from the reception unit 178, the control unit 177 of the relay terminal reads out the QoS request clearly indicated on the admission-request packet ADDTDrequest, and determines whether the relay terminal itself is able to meet the traffic's QoS request or not.

In this case, the control unit 177 of the relay terminal determines whether the relay terminal itself is able to meet the traffic's QoS request or not, according to, for example, its congestion status.

If it is determined that the relay terminal itself is able to meet the traffic's QoS request, the control unit 177 of the relay terminal outputs the admission-request packet ADDTSrequest to the transmission unit 175 while keeping the Admitted field as 1. The transmission unit 175 transmits the admission-request packet ADDTSrequest received from the control unit 177 to the destination terminal through the wireless interface module 16 and the antenna 11.

On the other hand, if it is determined that the relay terminal itself is not able to meet the traffic's QoS request, the control unit 177 of the relay terminal sets the Admitted field to 0 and outputs the admission-request packet ADDTSrequest to the transmission unit 175. The transmission unit 175 transmits the admission-request packet ADDTSrequest received from the control unit 177 to the destination terminal through the wireless interface module 16 and the antenna 11 (step S52).

The reception unit 178 of the destination terminal receives the admission-request packet ADDTSrequest from the relay terminal through the antenna 11 and the wireless interface module 16 and outputs the received admission-request packet ADDTSrequest to the control unit 177 through the identification unit 179.

Upon receiving the admission-request packet ADDTSrequest from the reception unit 178, the control unit 177 of the destination terminal determines, with reference to the Admitted field, whether the Admitted field of the received admission-request packet ADDTSrequest is set to 0.

Then, if the Admitted field is set to 0, the control unit 177 of the destination terminal instantly rejects the admission request from the source terminal. On the other hand, if the Admitted field is not set to 0, the control unit 177 of the destination terminal reads out the traffic's QoS request from the admission-request packet ADDTSrequest and determines whether the characteristics of the wireless communication path received in step S43 meet the traffic's QoS request, in order to allow or reject the traffic's QoS request. More specifically, the control unit 177 of the destination terminal allows or rejects the admission request in consideration of the traffic's QoS request and the characteristics of the wireless communication path (step S53).

After that, the destination terminal carries out step S46 described above. The relay terminal carries out step S47 described above, and the source terminal carries out step S48 described above. In this way, the series of operation ends.

If the Admitted field of the admission-request packet ADDTSrequest is set to 0, the control unit 177 of the destination terminal instantly rejects the admission request from the source terminal. If the Admitted field of the admission-request packet ADDTSrequest is set to 1, the control unit 177 of the destination terminal determines whether to allow or reject the admission request from the source terminal according to the characteristics of the wireless communication path (see step S53). Therefore, in Embodiment 2, the relay terminal substantially performs the admission control.

It should be noted that if it is determined that the relay terminal itself is not able to meet the traffic's QoS request, the control unit 177 of the relay terminal may produce an admission-reply packet ADDTSreply whose Status Code clearly indicates the rejection of the admission request and may transmit the packet to the source terminal without transmitting the admission-request packet ADDTSrequest to the destination terminal.

As described above, in Embodiment 2, in the multi-hop wireless network system including the source terminal, the relay terminal and the destination terminal, the source terminal and the relay terminal measure the characteristics of the wireless communication path and transmit the characteristics to the destination terminal. The relay terminal substantially determines whether to allow or reject the admission request from the source terminal (=the admission control).

Therefore, according to Embodiment 2, the admission control is readily carried out in the multi-hop wireless network system.

In the relay terminal, the control unit 177 substantially allowing or rejecting the admission request according to the admission-request packet ADDTSrequest forms a radio controller.

The rest is the same as Embodiment 1.

Embodiment 3

In Embodiment 3, the case where the source terminal performs the admission control is described.

Figure 13:
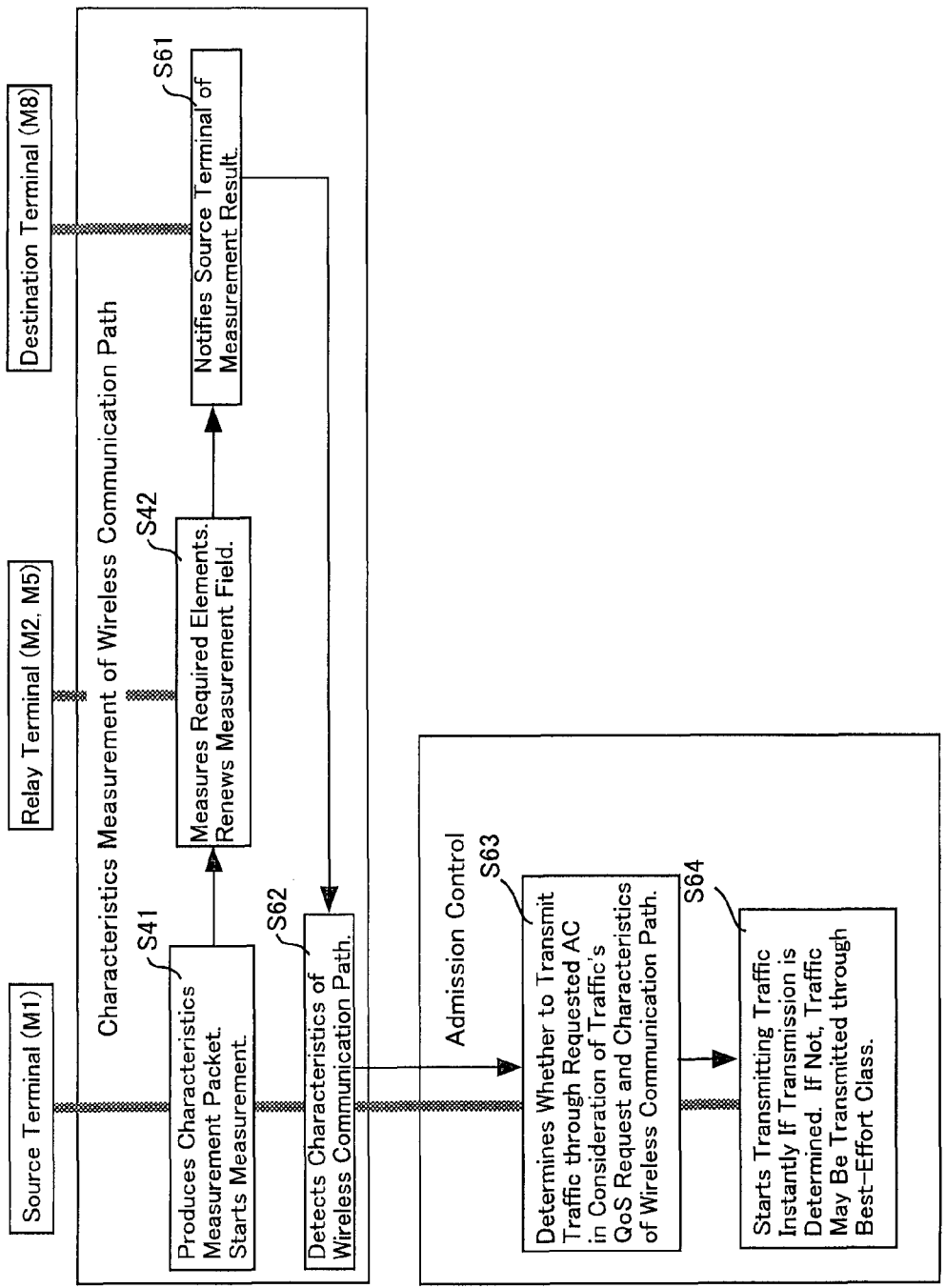
FIG. 13 is a flowchart illustrating how the source terminal performs the admission control.

FIG. 13 is a flowchart illustrating how the source terminal performs the admission control. The flowchart shown in FIG. 13 is identical with the flowchart shown in FIG. 11 except that steps S43 to S48 shown in the flowchart of FIG. 11 are replaced with steps S61 to S64.

As described above, once the series of operation has started, the source terminal and the relay terminal measure the characteristics of the wireless communication path from the source terminal to the destination terminal and transmit to the destination terminal a characteristics-measurement packet RMP including the measured characteristics of the wireless communication path (steps S41 and S42).

The reception unit 178 of the destination terminal receives the characteristics-measurement packet RMP from the relay terminal through the antenna 11 and the wireless interface module 16 and outputs the received characteristics-measurement packet RMP to the control unit 177 through the identification unit 179.

Upon receiving the characteristics-measurement packet RMP from the reception unit 178, the control unit 177 of the destination terminal reads out the congestion status, the delay time and the packet delivery ratio from the received characteristics-measurement packet RMP and detects that the characteristics of the wireless communication path from the source terminal to the destination terminal have been measured. Then, the control unit 177 of the destination terminal outputs the characteristics-measurement packet RMP to the transmission unit 175. The transmission unit 175 transmits the characteristics-measurement packet RMP received from the control unit 177 to the source terminal through the wireless interface module 16 and the antenna 11 (step S61).

The reception unit 178 of the source terminal receives the characteristics-measurement packet RMP from the destination terminal and outputs the received characteristics-measurement packet RMP to the control unit 177 through the identification unit 179. Upon receiving the characteristics-measurement packet RMP from the reception unit 178, the control unit 177 of the source terminal reads out the congestion status, the delay time and the packet delivery ratio included in the received characteristics-measurement packet RMP to detect the characteristics of the wireless communication path from the source terminal to the destination terminal (step S62).

After that, the control unit 177 of the source terminal determines whether the detected characteristics of the wireless communication path meet the traffic's QoS request and determines whether to transmit the traffic with the corresponding Access Category AC1 (step S63).

If it is determined that the traffic is to be transmitted through the corresponding Access Category AC1, the control unit 177 of the source terminal produces an allowance signal ALLW and transmits the signal to the classification unit 171. In response to the allowance signal ALLW from the control unit 177, the classification unit 171 notifies the upper layer 18 that the admission control for the traffic has been allowed and stores the packet PKT of the traffic into the queue of the corresponding Access Category with higher priority. That is to say, if the allowance of the admission request is stored in the Status Code of the admission-reply packet ADDTSreply, the source terminal starts to transmit the traffic through the corresponding Access Category with higher priority (step S64).

On the other hand, if it is determined that the traffic is not to be transmitted with the corresponding Access Category AC1, the control unit 177 of the source terminal produces a rejection signal REJ and outputs the signal to the classification unit 171. In response to the rejection signal REJ from the control unit 177, the classification unit 171 of the source terminal notifies the upper layer 18 that the admission control for the traffic has been rejected and rejects to store the packet PKT into the buffer for the Access Category with higher priority. In this way, the series of operation ends.

As described above, in Embodiment 3, in the multi-hop wireless network system including the source terminal, the relay terminal and the destination terminal, the source terminal and the relay terminal measure the characteristics of the wireless communication path and transmit the characteristics to the destination terminal. The destination terminal notifies the source terminal of the characteristics of the wireless communication path. The source terminal determines whether to allow or reject the admission request (=the admission control) according to the characteristics of the wireless communication path received from the destination terminal.

Therefore, according to Embodiment 3, the admission control is easily performed even in the multi-hop wireless network system.

In the source terminal, the control unit 177 allowing or rejecting the admission request forms a radio controller.

The rest is the same as Embodiment 1.

Embodiment 4

In Embodiment 4, the case where the centralized control terminal performs the admission control is described. The centralized control terminal is none of the source terminal, the relay terminal and the destination terminal. If the multi-hop wireless network system 10 is a mesh wireless network system, the centralized control terminal includes, for example, a gateway (GW: GateWay=the radio device M3, as it is referred to hereinafter).

When the centralized control terminal performs the admission control, the characteristics of the wireless communication path described above are measured on a regular basis or when the admission control is required. The measured characteristics of the wireless communication path are then transmitted to the centralized control terminal. Therefore, upon receiving the characteristics-measurement packet RMP from the relay terminal, the destination terminal transmits the received characteristics-measurement packet RMP to the centralized control terminal.

Further, when the centralized control terminal performs the admission control, whether to allow or reject the admission request is not determined according only to the above-described characteristics of the wireless communication path but also to the network status of the multi-hop wireless network system 10. Here, the network status includes a number of the traffic in the multi-hop wireless network system 10, distinguishing between the radio devices carrying out wireless communication over the multi-hop wireless network system 10 and the radio devices carrying out no wireless communication, and the topology of the radio devices M1 to M9 in the multi-hop wireless network system 10, for example.

Figure 14:
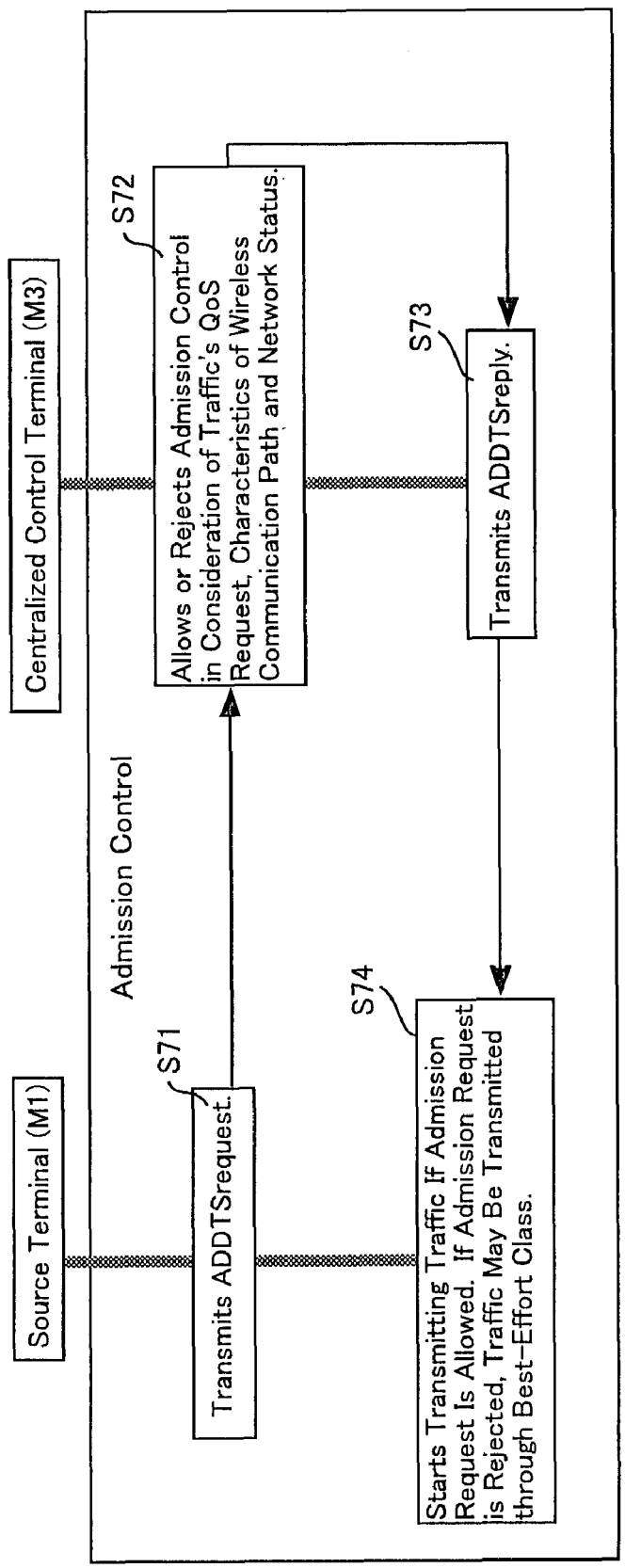
FIG. 14 is a flowchart illustrating how the centralized control terminal performs the admission control.

FIG. 14 is a flowchart illustrating how the centralized control terminal performs the admission control. Once the series of operation has started, the control unit 177 of the source terminal produces an admission-request packet ADDTSrequest clearly indicating the traffic characteristics and the QoS request and outputs to the transmission unit 175 the produced admission-request packet ADDTSrequest. The transmission unit 175 transmits the admission-request packet ADDTSrequest received from the control unit 177 to the centralized control terminal through the wireless interface module 16 and the antenna 11 (step S71).

The reception unit 178 of the centralized control terminal receives the admission-request packet ADDTSrequest from the source terminal through the antenna 11 and the wireless interface module 16 and outputs the received admission-request packet ADDTSrequest to the control unit 177 through the identification unit 179. Upon receiving the admission-request packet ADDTSrequest, the control unit 177 of the centralized control terminal reads out the traffic's QoS request from the admission-request packet ADDTSrequest and determines whether the characteristics of the wireless communication path and the network status meet the traffic's QoS request to allow or reject the traffic's QoS request. That is to say, the control unit 177 of the centralized control terminal allows or rejects the admission request in consideration of the traffic's QoS request, the characteristics of the wireless communication path and the network status (step S72).

After allowing or rejecting the admission request, the control unit 177 of the centralized control terminal stores the allowance or the rejection into the Status Code (see FIG. 6), produces an admission-reply packet ADDTSreply, and outputs the produced admission-reply packet ADDTSreply to the transmission unit 175. The transmission unit 175 transmits the admission-reply packet ADDTSreply received from the control unit 177 to the source terminal through the wireless interface module 16 and the antenna 11 (step S73).

After that, the reception unit 178 of the source terminal receives the admission-reply packet ADDTSreply from the centralized control terminal and outputs the received admission-reply packet ADDTSreply to the control unit 177 through the identification unit 179.

Upon receiving the admission-reply packet ADDTSreply from the reception unit 178, the control unit 177 of the source terminal determines whether the admission request has been allowed or rejected with reference to the Status Code of the received admission-reply packet ADDTSreply. Then, if the allowance of the admission request is stored in the Status Code of the admission-reply packet ADDTSreply, the control unit 177 of the source terminal determines that the admission request has been allowed, produces an allowance signal ALLW and outputs the signal to the classification unit 171.

In response to the allowance signal ALLW from the control unit 177, the classification unit 171 of the source terminal notifies the upper layer 18 that the admission control for the traffic has been allowed and stores the packet PKT of the traffic into the queue of the corresponding Access Category with higher priority. More specifically, if the allowance of the admission request is stored in the Status Code of the admission-reply packet ADDTSreply, the source terminal starts to transmit the traffic through the corresponding Access Category with higher priority (step S74).

On the other hand, if the rejection of the admission request is stored in the Status Code of the admission-reply packet ADDTSreply, the control unit 177 of the source terminal determines that the admission request has been rejected, produces a rejection signal REJ and outputs the signal to the classification unit 171. In response to the rejection signal REJ from the control unit 177, the classification unit 171 of the source terminal notifies the upper layer 18 that the admission control for the traffic has been rejected and rejects to store the packet PKT into the buffer for the Access Category with higher priority.

It should be noted that the control unit 177 of the source terminal may starts to transmit the traffic through the best effort class even if the rejection of the admission request is stored in the Status Code of the admission-reply packet ADDTSreply.

In this way, the operation where the centralized control terminal performs the admission control ends.

As described above, in Embodiment 4, in the multi-hop wireless network system including the source terminal, the relay terminal, the destination terminal and the centralized control terminal, the centralized control terminal is aware of the characteristics of the wireless communication path and the network status and allows or rejects the traffic's QoS request from the source terminal (=the admission control) according to the characteristics of the wireless communication path and the network status.

Therefore, according to Embodiment 4, the admission control is easily carried out in the multi-hop wireless network system.

In the centralized control terminal, the control unit 177 allowing or rejecting the admission request according to the admission-request packet ADDTSrequest forms a radio controller.

The rest is the same as Embodiment 1.

SPECIFIC EXAMPLES OF ADMISSION CONTROL

Specific examples of the admission control are described below taking the case where the relay terminal performs the admission control as an analogy.

Specific Example 1

Figure 15:
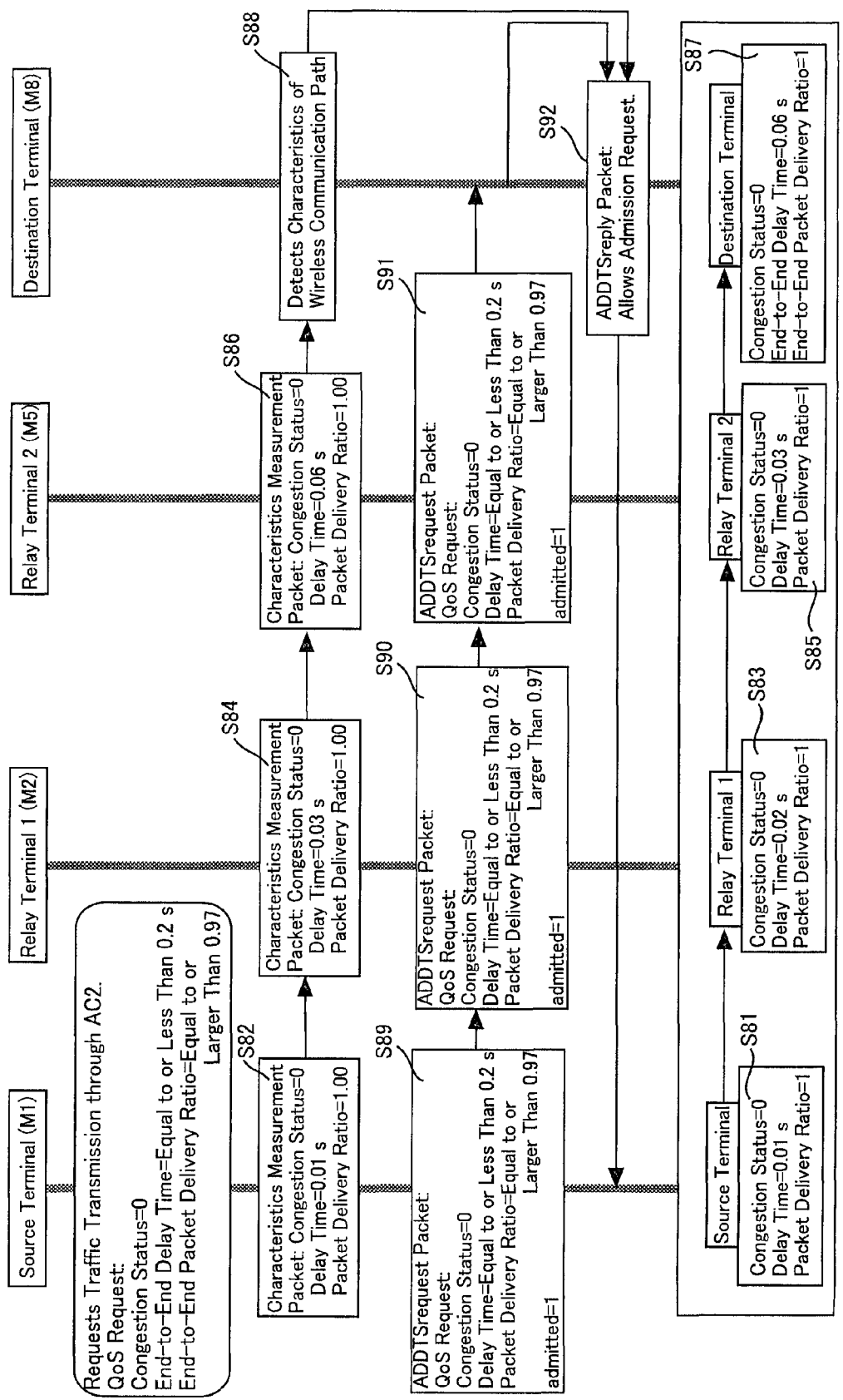
FIG. 15 is a flowchart illustrating Specific Example 1 of the admission control.

FIG. 15 is a flowchart illustrating Specific Example 1 of the admission control. The source terminal requests transmission of the traffic through the Access Category AC2. The traffic's QoS request includes the congestion status=0, the end-to-end delay time equal to or less than 0.2 s, and the packet delivery ratio equal to or larger than 0.97.

Once the series of operation has started, the source terminal measures the congestion status=0, the delay time=0.01 s and the packet delivery ratio=1.00 at the source terminal itself with the methods described above (step S81), produces a characteristics-measurement packet RMP including the measured congestion status=0, delay time=0.01 s and packet delivery ratio=1.00 and transmits the packet to the relay terminal 1 (step S82).

Upon receiving the characteristics-measurement packet RMP from the source terminal, the relay terminal 1 measures the congestion status=0, the delay time=0.02 s and the packet delivery ratio=1 at the relay terminal 1 itself (step S83) and renews the congestion status=0, the delay time=0.01 s and the packet delivery ratio=1.00 included in the characteristics-measurement packet RMP to the congestion status=0, the delay time=0.03 s and the packet delivery ratio=1, respectively, using the measured congestion status=0, delay time=0.02 s and packet delivery ratio=1. The relay terminal 1 transmits the characteristics-measurement packet RMP including the renewed congestion status=0, delay time=0.03 s and packet delivery ratio=1 to the relay terminal 2 (step S84).

Upon receiving the characteristics-measurement packet RMP from the relay terminal 1, the relay terminal 2 measures the congestion status=0, the delay time=0.03 s and the packet delivery ratio=1 at the relay terminal 2 itself (step S85) and renews the congestion status=0, the delay time=0.03 s and the packet delivery ratio=1.00 included in the characteristics-measurement packet RMP to the congestion status=0, the delay time=0.06 s and the packet delivery ratio=1, respectively, using the measured congestion status=0, delay time=0.03 s and packet delivery ratio=1. The relay terminal 2 transmits the characteristics-measurement packet RMP including the renewed congestion status=0, delay time=0.06 s and packet delivery ratio=1 to the destination terminal (step S86).

The destination terminal receives from the relay terminal 2 the characteristics-measurement packet RMP=[the congestion status=0/the delay time=0.06 s/the packet delivery ratio=1] and reads out the congestion status=0/the delay time=0.06 s/the packet delivery ratio=1 from the received characteristics-measurement packet RMP=[the congestion status=0/the delay time=0.06 s/the packet delivery ratio=1] (step S87) and detects the characteristics of the wireless communication path (step S88).

After that, the control unit 177 of the source terminal sets the Admitted field to 1, produces an admission-request packet ADDTSrequest clearly indicating the QoS request=[the congestion status=0, the end-to-end delay time=equal to or less than 0.2 and the packet delivery ratio=equal to or larger than 0.97], and transmits the packet to the relay terminal 1 (step S89).

Upon receiving the admission-request packet ADDTSrequest from the source terminal, the control unit 177 of the relay terminal 1 reads out the QoS request=[the congestion status=0, the end-to-end delay time=equal to or less than 0.2 and the packet delivery ratio=equal to or larger than 0.97] included in the admission-request packet ADDTSrequest and determines whether to allow or reject the traffic's QoS request from the source terminal according to the characteristics, [the congestion status=0, the delay time=0.03 s and the packet delivery ratio=1], of the wireless communication path from the source terminal to the relay terminal 1.

In this case, the congestion status=0 of the path from the source terminal to the relay terminal 1 satisfies the congestion status=0 included in the QoS request. The delay time=0.03 s from the source terminal to the relay terminal 1 covers the delay time=equal to or less than 0.2 included in the QoS request. The packet delivery ratio=1 from the source terminal to the relay terminal 1 covers the packet delivery ratio=equal to or larger than 0.97 included in the QoS request. Therefore, the control unit 177 of the relay terminal 1 allows the traffic's QoS request from the source terminal. In other words, the control unit 177 of the relay terminal 1 allows the admission request from the source terminal. Then, the control unit 177 of the relay terminal 1 transmits the admission-request packet ADDTSrequest to the relay terminal 2 while keeping the Admitted field as 1 (step S90).

Upon receiving the admission-request packet ADDTSrequest from the relay terminal 1, the control unit 177 of the relay terminal 2 reads out the QoS request=[the congestion status=0, the end-to-end delay time=equal to or less than 0.2, and the packet delivery ratio=equal to or larger than 0.97] included in the admission-request packet ADDTSrequest and determines whether to allow or rejects the traffic's QoS request from the source terminal according to the characteristics, [the congestion status=0, the delay time=0.06 s, and the packet delivery ratio=1], of the wireless communication path from the source terminal to the relay terminal 2.

In this case, the congestion status=0 of the path from the source terminal to the relay terminal 2 satisfies the congestion status=0 included in the QoS request. The delay time=0.06 s from the source terminal to the relay terminal 2 satisfies the delay time=equal to or less than 0.2 s included in the QoS request. The packet delivery ratio=1 from the source terminal to the relay terminal 2 covers the packet delivery ratio=equal to or larger than 0.97 included in the QoS request. Therefore, the control unit 177 of the relay terminal 2 allows the traffic's QoS request from the source terminal. In other words, the control unit 177 of the relay terminal 2 allows the admission request from the source terminal. Then, the control unit 177 of the relay terminal 2 transmits the admission-request packet ADDTSrequest to the destination terminal while keeping the Admitted field as 1 (step S91).

Upon receiving the admission-request packet ADDTSrequest from the relay terminal 2, the control unit 177 of the destination terminal detects that the Admitted field of the admission-request packet ADDTSrequest is set to 1 and that the relay terminals 1 and 2 have allowed the admission request from the source terminal.

Then, the control unit 177 of the destination terminal determines whether to allow or rejects the QoS request=[the congestion status=0, the end-to-end delay time=equal to or less than 0.2 and the packet delivery ratio=equal to or larger than 0.97] received from the source terminal according to the characteristics=[the congestion status=0, the end-to-end delay time=0.06 s and the packet delivery ratio=1] of the wireless communication path received in step S88.

In this case, the congestion status=0 of the wireless communication path from the source terminal to the destination terminal meets the congestion status=0 included in the QoS request. The delay time=0.06 s from the source terminal to the destination terminal meets the delay time=equal to or less than 0.2 s included in the QoS request. The packet delivery ratio=1 from the source terminal to the destination terminal meets the packet delivery ratio=equal to or larger than 0.97 included in the QoS request. Therefore, the control unit 177 of the destination terminal allows the traffic's QoS request from the source terminal. In other words, the control unit 177 of the destination terminal allows the admission request from the source terminal. The control unit 177 of the destination terminal then produces an admission-reply packet ADDTSreply whose Status Code stores the allowance of the admission request and transmits the packet to the source terminal (step S92).

After that, the source terminal receives the admission-reply packet ADDTSreply including the allowance of the admission request and starts to transmit the traffic that belongs to the corresponding Access Category.

Specific Example 2

Figure 16:
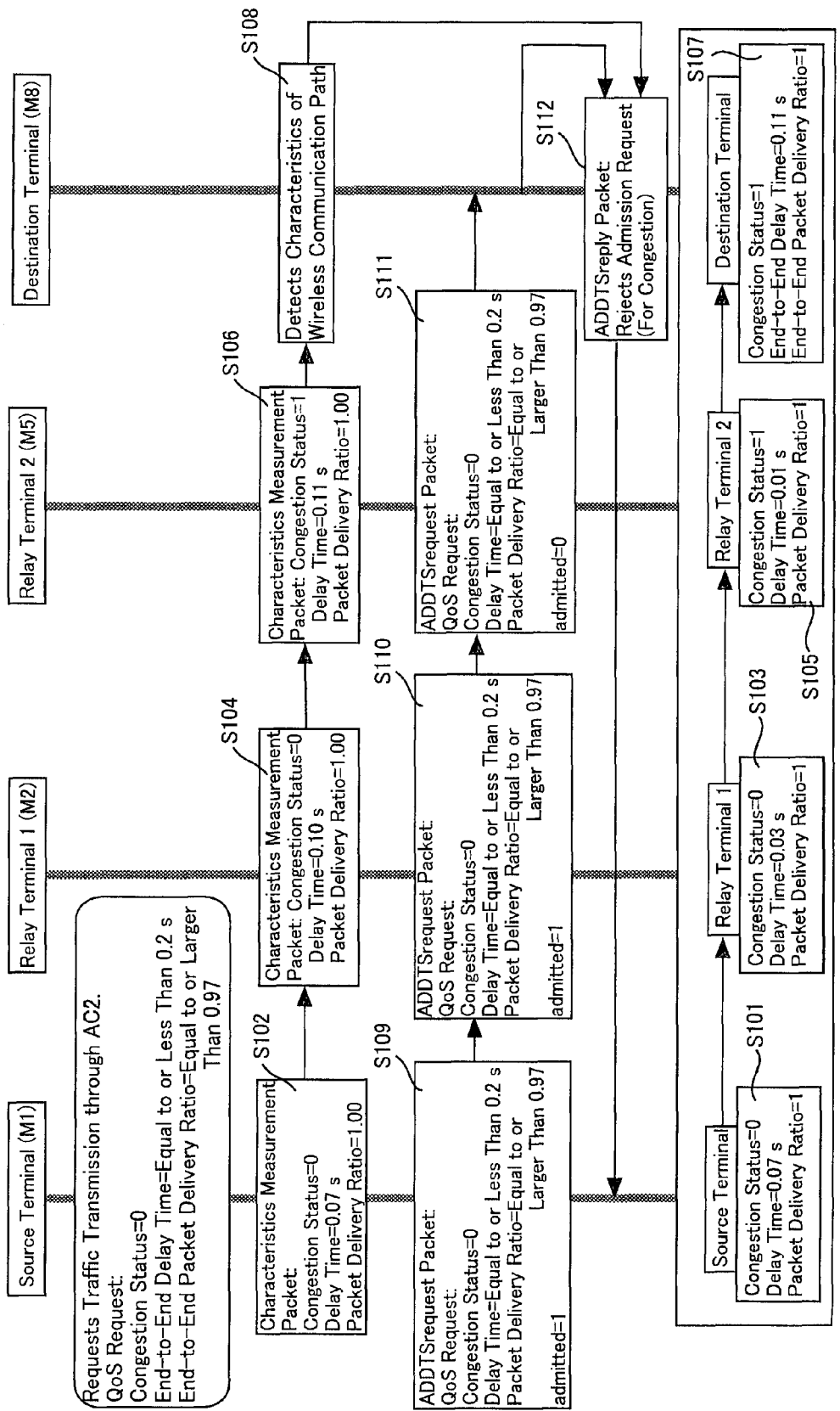
FIG. 16 is a flowchart illustrating Specific Example 2 of the admission control.

FIG. 16 is a flowchart illustrating Specific Example 2 of the admission control. The QoS request in Specific Example 2 is the same QoS request as in Specific Example 1.

Once the series of operation has started, the source terminal measures the congestion status=0, the delay time=0.07 s and the packet delivery ratio=1.00 at the source terminal itself with the above-described methods (step S101), produces a characteristics-measurement packet RMP including the measured congestion status=0, delay time=0.07 s and packet delivery ratio=1.00 and transmits the packet to the relay terminal 1 (step S102).

Upon receiving the characteristics-measurement packet RMP from the source terminal, the relay terminal 1 measures the congestion status=0, the delay time=0.03 s and the packet delivery ratio=1 at the relay terminal 1 itself (step S103) and renews the congestion status=0, the delay time=0.07 s and the packet delivery ratio=1.00 included in the characteristics-measurement packet RMP to the congestion status=0, the delay time=0.10 s and the packet delivery ratio=1, respectively, using the measured congestion status=0, delay time=0.03 s and packet delivery ratio=1. Then, the relay terminal 1 transmits the characteristics-measurement packet RMP including the renewed congestion status=0, delay time=0.10 s and packet delivery ratio=1 to the relay terminal 2 (step S104).

Upon receiving the characteristics-measurement packet RMP from the relay terminal 1, the relay terminal 2 measures the congestion status=1, the delay time=0.01 s and the packet delivery ratio=1 at the relay terminal 2 itself (step S105) and renews the congestion status=0, the delay time=0.10 s and the packet delivery ratio=1.00 included in the characteristics-measurement packet RMP to the congestion status=1, the delay time=0.11 s and the packet delivery ratio=1, respectively, using the measured congestion status=1, delay time=0.1 s and packet delivery ratio=1. The relay terminal 2 transmits the characteristics-measurement packet RMP including the renewed congestion status=1, delay time=0.11 s and packet delivery ratio=1 to the destination terminal (step S106).

The destination terminal receives from the relay terminal 2 the characteristics-measurement packet RMP=[the congestion status=1/the delay time=0.11 s/the packet delivery ratio=1] and reads out the congestion status=1/the delay time=0.11 s/the packet delivery ratio=1 from the received characteristics-measurement packet RMP=[the congestion status=1/the delay time=0.11 s/the packet delivery ratio=1] (step S107), to detect the characteristics of the wireless communication path (step S108).

After that, the control unit 177 of the source terminal sets the Admitted field to 1, produces an admission-request packet ADDTSrequest clearly indicating the QoS request=[the congestion status=0, the end-to-end delay time=equal to or less than 0.2 and the packet delivery ratio=equal to or larger than 0.97] and transmits the packet to the relay terminal 1 (step S109).

Upon receiving the admission-request packet ADDTSrequest from the source terminal, the control unit 177 of the relay terminal 1 reads out the QoS request=[the congestion status=0, the end-to-end delay time=equal to or less than 0.2 and the packet delivery ratio=equal to or larger than 0.97]

included in the admission-request packet ADDTSrequest and determines whether to allow or reject the traffic's QoS request from the source terminal according to the characteristics, [the congestion status=0, the delay time=0.10 s and the packet delivery ratio=1], of the wireless communication path from the source terminal to the relay terminal 1.

In this case, the congestion status=0 from the source terminal to the relay terminal 1 meets the congestion status=0 included in the QoS request. The delay time=0.10 s from the source terminal to the relay terminal 1 meets the delay time=equal to or larger than 0.2 s included in the QoS request. The packet delivery ratio=1 from the source terminal to the relay terminal 1 meets the packet delivery ratio=equal to or larger than 0.97 included in the QoS request. Therefore, the control unit 177 of the relay terminal 1 allows the traffic's QoS request from the source terminal. That is to say, the control unit 177 of the relay terminal 1 allows the admission request from the source terminal. Then, the control unit 177 of the relay terminal 1 transmits the admission-request packet ADDTSrequest to the relay terminal 2 while keeping the Admitted field as 1 (step S110).

Upon receiving the admission-request packet ADDTSrequest from the relay terminal 1, the control unit 177 of the relay terminal 2 reads out the QoS request=[the congestion status=0, the end-to-end delay time=equal to or less than 0.2 and the packet delivery ratio=equal to or larger than 0.97] from the admission-request packet ADDTSrequest and determines whether to allow or reject the traffic's QoS request from the source terminal according to the characteristics, [the congestion status=1, the delay time=0.11 s and the packet delivery ratio=1], of the wireless communication path from the source terminal to the relay terminal 2.

In this case, the congestion status=1 from the source terminal to the relay terminal 2 does not meet the congestion status=0 included in the QoS request, and therefore, the control unit 177 of the relay terminal 2 rejects the traffic's QoS request from the source terminal. That is to say, the control unit 177 of the relay terminal 2 rejects the admission request from the source terminal. Then, the control unit 177 of the relay terminal 2 sets the Admitted field to 0 and transmits the admission-request packet ADDTSrequest to the destination terminal (step sill).

Upon receiving the admission-request packet ADDTSrequest from the relay terminal 2, the control unit 177 of the destination terminal detects that the Admitted field of the admission-request packet ADDTSrequest is set to 0 and that either of the relay terminal 1 and the relay terminal 2 has rejected the admission request from the source terminal.

Then, the control unit 177 of the destination terminal produces an admission-reply packet ADDTSreply whose Status Code indicates that the admission request has been rejected for congestion and transmits the packet to the source terminal (step S112).

After that, the source terminal receives the admission-reply packet ADDTSreply including the rejection of the admission request and stops transmitting the traffic.

Specific Example 3

Figure 17:
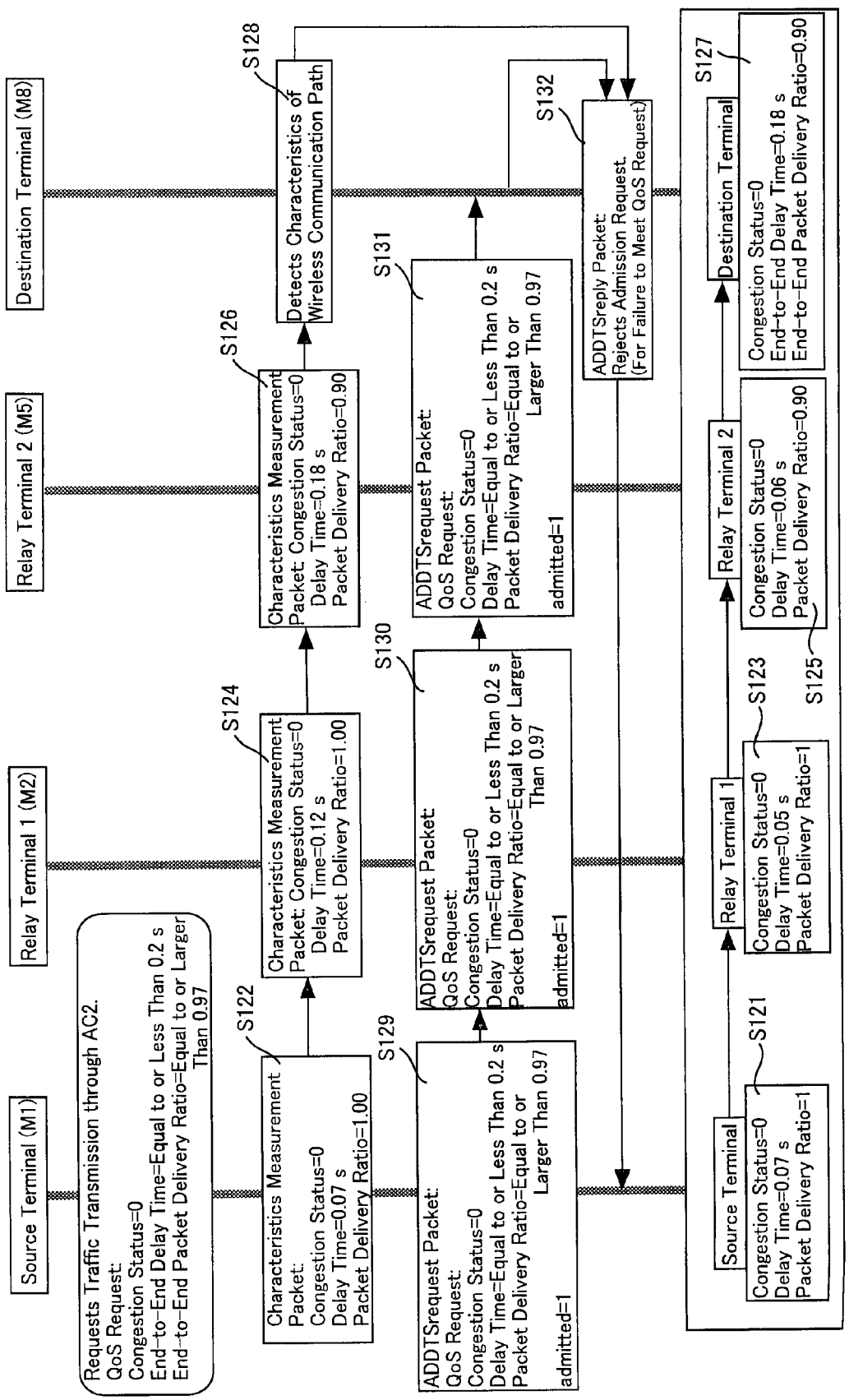
FIG. 17 is a flowchart illustrating Specific Example 3 of the admission control.

FIG. 17 is a flowchart illustrating Specific Example 3 of the admission control. The QoS request in Specific Example 3 is the same QoS request as in Specific Example 1.

Once the series of operation has started, the source terminal measures the congestion status=0, the delay time=0.07 s and the packet delivery ratio=1.00 at the source terminal itself with the methods described above (step S121) produces a characteristics-measurement packet RMP including the measured congestion status=0, delay time=0.07 s and packet delivery ratio=1.00 and transmits the packet to the relay terminal 1 (step S122).

Upon receiving the characteristics-measurement packet RMP from the source terminal, the relay terminal 1 measures the congestion status=0, the delay time=0.05 s and the packet delivery ratio=1 at the relay terminal 1 itself (step S123) and renews the congestion status=0, the delay time=0.07 s and the packet delivery ratio=1.00 included in the characteristics-measurement packet RMP to the congestion status=0, the delay time=0.12 s and the packet delivery ratio=1, respectively, using the measured congestion status=0, delay time=0.05 s and packet delivery ratio=1. The relay terminal 1 transmits the characteristics-measurement packet RMP including the renewed congestion status=0, delay time=0.12 s and packet delivery ratio=1 to the relay terminal 2 (step S124).

Upon receiving the characteristics-measurement packet RMP from the relay terminal 1, the relay terminal 2 measures the congestion status=0, the delay time=0.06 s and the packet delivery ratio=0.90 at the relay terminal 2 itself (step S125) and renews the congestion status=0, the delay time=0.12 s and the packet delivery ratio=1.00 included in the characteristics-measurement packet RMP to the congestion status=0, the delay time=0.18 s and the packet delivery ratio=0.90, respectively, using the congestion status=0, the delay time=0.06 s and the packet delivery ratio=0.90. The relay terminal 2 transmits the characteristics-measurement packet RMP including the renewed congestion status=0, delay time=0.18 s and packet delivery ratio=0.90 to the destination terminal (step S126).

The destination terminal receives from the relay terminal 2 the characteristics-measurement packet RMP=[the congestion status=0/the delay time=0.18 s/the packet delivery ratio=0.90] and reads out the congestion status=0/the delay time=0.18 s/the packet delivery ratio=0.90 from the received characteristics-measurement packet RMP-[the congestion status=0/the delay time=0.18 s/the packet delivery ratio=0.90] (step S127) to detect the characteristics of the wireless communication path (step S128).

After that, the control unit 177 of the source terminal sets the Admitted field to 1, produces an admission-request packet ADDTSrequest clearly indicating the QoS request=[the congestion status=0, the end-to-end delay time=equal to or less than 0.2, and the packet delivery ratio=equal to or larger than 0.97] and transmits the packet to the relay terminal 1 (step S129).

Upon receiving the admission-request packet ADDTSrequest from the source terminal, the control unit 177 of the relay terminal 1 reads out the QoS request=[the congestion status=0, the end-to-end delay time-equal to or less than 0.2 and the packet delivery ratio=equal to or larger than 0.97] included in the admission-request packet ADDTSrequest and determines whether to allow or reject the traffic's QoS request from the source terminal according to the characteristics, [the congestion status=0, the delay time=0.12 s and the packet delivery ratio=1], of the wireless communication path from the source terminal to the relay terminal 1.

In this case, the congestion status=0 from the source terminal to the relay terminal 1 meets the congestion status=0 included in the QoS request. The delay time=0.12 s from the source terminal to the relay terminal 1 meets the delay time=equal to or less than 0.2 s included in the QoS request. The packet delivery ratio=1 from the source terminal to the relay terminal 1 meets the packet delivery ratio=equal to or larger than 0.97 included in the QoS request. Therefore, the control unit 177 of the relay terminal 1 allows the traffic's QoS request from the source terminal. That is to say, the control unit 177 of the relay terminal 1 allows the admission request from the source terminal. Then, the control unit 177 of the relay terminal 1 transmits the admission-request packet ADDTSrequest to the relay terminal 2 while keeping the Admitted field as 1 (step S130).

Upon receiving the admission-request packet ADDTSrequest from the relay terminal 1, the control unit 177 of the relay terminal 2 reads out the QoS request=[the congestion status=0, the end-to-end delay time=equal to or less than 0.2 and the packet delivery ratio=equal to or larger than 0.97] from the admission-request packet ADDTSrequest and determines whether to allow or reject the traffic's QoS request from the source terminal according to the characteristics, [the congestion status=0, the delay time=0.18 s and the packet delivery ratio=1], of the wireless communication path from the source terminal to the relay terminal 2.

In this case, the congestion status=0 from the source terminal to the relay terminal 2 meets the congestion status=0 included in the QoS request. The delay time=0.18 s from the source terminal to the relay terminal 2 meets the delay time=equal to or less than 0.2 s included in the QoS request. The packet delivery ratio=1 from the source terminal to the relay terminal 2 meets the packet delivery ratio=equal to or larger than 0.97 included in the QoS request. Therefore, the control unit 177 of the relay terminal 2 allows the traffic's QoS request from the source terminal. That is to say, the control unit 177 of the relay terminal 2 allows the admission request from the source terminal. Then, the control unit 177 of the relay terminal 2 transmits the admission-request packet ADDTSrequest to the destination terminal while keeping the Admitted field as 1 (step S131).

Upon receiving the admission-request packet ADDTSrequest from the relay terminal 2, the control unit 177 of the destination terminal detects that the Admitted field of the admission-request packet ADDTSrequest is set to 1 and that both of the relay terminal 1 and the relay terminal 2 have allowed the admission request from the source terminal.

Then, the control unit 177 of the destination terminal determines whether to allow or reject the QoS request=[the congestion status=0, the end-to-end delay time=equal to or less than 0.2 s and the packet delivery ratio=equal to or larger than 0.97] received from the source terminal according to the characteristics=[the congestion status=0, the end-to-end delay time=0.18 s and the packet delivery ratio=0.90] of the wireless communication path, which are received in step S128.

In this case, the packet delivery ratio=0.90 from the source terminal to the destination terminal does not meet the packet delivery ratio=equal to or larger than 0.97 included in the QoS request and therefore, the control unit 177 of the destination terminal rejects the traffic's QoS request from the source terminal. That is to say, the control unit 177 of the destination terminal rejects the admission request from the source terminal. Then, the control unit 177 of the destination terminal produces an admission-reply packet ADDTSreply whose Status Code includes the rejection of the admission request and transmits the packet to the source terminal (step S132).

After that, the source terminal receives the admission-reply packet ADDTSreply including the rejection of the admission request and stops transmitting the traffic.

[Bandwidth Reservation at Relay Terminal]

Figure 18:
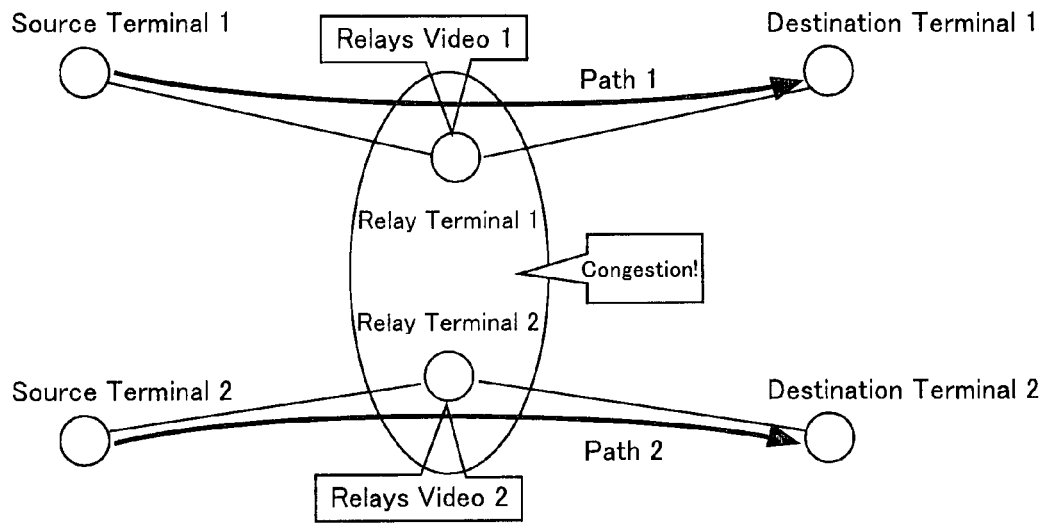
FIG. 18 is a diagram illustrating a problem that occurs when admission requests from a plurality of traffic streams are allowed at the same time.

FIG. 18 is a diagram illustrating a problem that occurs when the admission requests from a plurality of traffic streams are allowed at the same time. The relay terminals 1 and 2 are provided in the same communication range. What is described below is the case where the relay terminal 1 is allowed to relay Video 1, which has been transmitted from the source terminal 1, to the destination terminal 1 over Path 1, whereas the relay terminal 2 is also allowed to relay Video 2, which has been transmitted from the source terminal 2, to the destination terminal 2 over Path 2.

In this case, the admission requests for these two streams of traffic are allowed according to the characteristics of the wireless communication path measured before the relay terminals 1 and 2 start to transmit, respectively, Video 1 and 2. Therefore, the relay terminal 1 does not consider the effect from Video 2, and the relay terminal 2 does not consider the effect from Video 1, either.

Therefore, if these two streams of traffic are transmitted at the same time, the traffic loads in the communication range of the relay terminals 1 and 2 may drastically increase, which may cause congestion.

Figure 19:
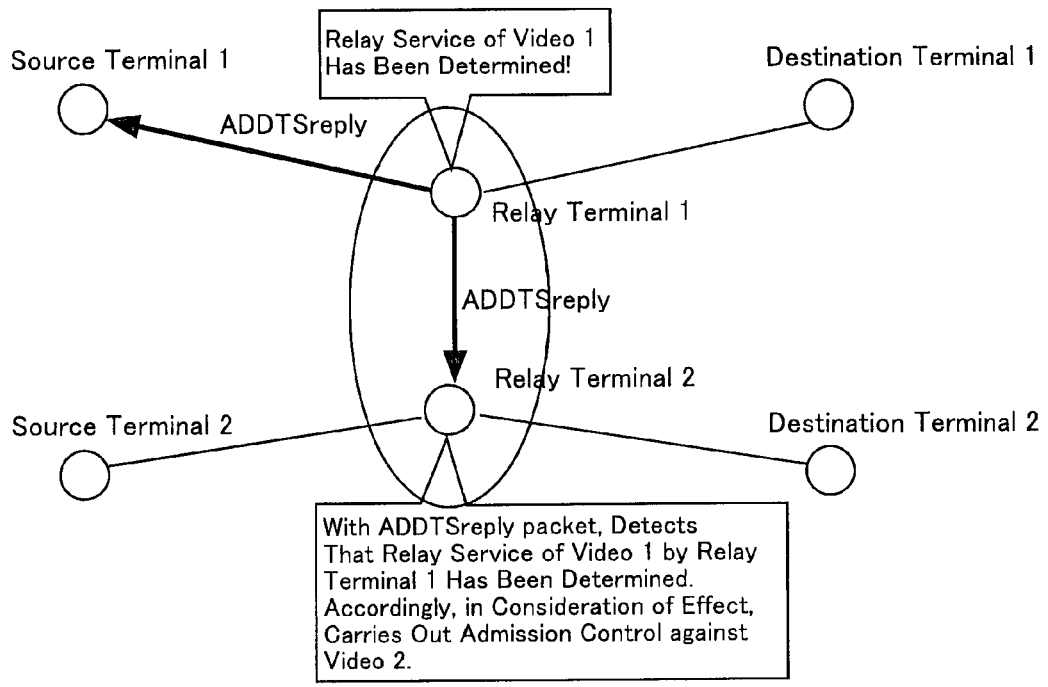
FIG. 19 is a diagram illustrating a method of avoiding the congestion shown in FIG. 18.

FIG. 19 is a diagram illustrating a method of avoiding the congestion shown in FIG. 18. When a relaying service has been determined for a specific traffic, in order to avoid the aforementioned problem, each relay terminal is required to notify their neighboring terminals of the relaying service that is to be carried out by the relay terminal itself.

Upon receiving the admission-reply packet ADDTSreply1 from the destination terminal 1, the relay terminal 1 relays the received admission-reply packet ADDTSreply1 to the source terminal 1. In this case, the relay terminals 1 and 2 are provided in the same communication range, and therefore, the relay terminal 2 receives the admission-reply packet ADDTSreply1 transmitted from the relay terminal 1.

The relay terminal 2 also receives an admission-reply packet ADDTSreply2 from the destination terminal 2 and transmits the received admission-reply packet ADDTSreply2 to the source terminal 2. The relay terminal 1 receives the admission-reply packet ADDTSreply2 transmitted from the relay terminal 2.

Then, since each of the relay terminals 1 and 2 receives the two admission-reply packets ADDTSreply 1 and ADDTSreply 2, each of the relay terminals 1 and 2 reserves a bandwidth that meets the QoS requests indicated in the received admission-reply packets ADDTSreply1 and 2.

Further, the source terminals 1 and 2 receive the admission-reply packets ADDTSreply1 and 2, respectively, and detects that the admission request has been allowed. Then, the source terminals 1 and 2 broadcast the admission-reply packets ADDTSreply1 and 2, respectively, to clearly notify their neighboring terminals that a new stream of traffic is going to be transmitted in the near future.

In this way, congestion is avoided even if the two relay terminals 1 and 2, which relay two streams of traffic, are located in the same communication range.

It is described above that the control unit 177 (=the radio controller) performing the admission control is to be provided in any one of the source terminal, the relay terminals 1 and 2, the destination terminal and the centralized control terminal. In the multi-hop wireless network system according to the invention, however, the control unit 177 (=the radio controller) performing the admission control may be provided in any position of the multi-hop wireless network system. Therefore, the multi-hop wireless network system according to the invention may include the source terminal, the relay terminal, the destination terminal, and the radio controller performing the admission control. This is because if a radio controller performing the admission control is provided, the admission control in the multi-hop wireless network system is intensively administrated.

The QoS request forms the quality maintenance request.

The admission-request packet ADDTSrequest forms the decision-request packet.

The admission-reply packet ADDTSreply including the allowance of the admission request forms the first decision-reply packet. The admission-reply packet ADDTSreply including the rejection of the admission request forms the second decision-reply packet.

The value 1 in the Admitted field is the first flag. The value 0 in the Admitted field is the second flag.

The TSPEC represents the quality required by the traffic.

The embodiments as have been described here are mere examples and should not be interpreted as restrictive. The scope of the present invention is determined by each of the claims, not by the written description of the embodiments, and embraces modifications within the meaning of, and equivalent to, the languages in the claims.

INDUSTRIAL APPLICABILITY

The present invention is applied to the multi-hop wireless network system allowing for the admission control.

The invention claimed is:

1. A multi-hop wireless network system, comprising:
a first radio device as the source;
a second radio device (M8) as the destination;
a third radio device relaying wireless communications between the first and the second radio devices; and
a radio controller allowing or rejecting a quality maintenance request according to characteristics of a wireless communication path running from the first radio device to the second radio device through the third radio device, the quality maintenance request requesting transmission of traffic with a certain level of quality, the traffic being a stream of packets transmitted from the first radio device to the second radio device; wherein
the first and the third radio devices measure characteristics of the wireless communication path,
the radio controller receives the measured characteristics of the wireless communication path and allows or rejects the quality maintenance request according to the received characteristics of the wireless communication path, and
the first radio device starts to transmit the traffic to the second radio device through the third radio device if the quality maintenance request is allowed by the radio controller.

2. The multi-hop wireless network system according to claim 1, wherein the radio controller is provided in the second radio device;
the first and the third radio devices transmit the measured characteristics of the wireless communication path to the second radio devices; and
the second radio device allows or rejects the quality maintenance request according to the measured characteristics of the wireless communication path.

3. The multi-hop wireless network system according to claim 2, wherein the first radio device measures first characteristics of the wireless communication path at the first radio device itself and transmits an characteristics-measurement packet to the third radio device, the characteristics-measurement packet including the measured first characteristics and requesting characteristics measurement of the wireless communication path;

the third radio device measures second characteristics of the wireless communication path at the third radio device itself upon receiving the characteristics-measurement packet, renews the first characteristics included in the characteristics-measurement packet to third characteristics using the measured second characteristics, and transmits a characteristics-measurement packet including the renewed third characteristics to the second radio device; and
the second radio device allows or rejects the quality maintenance request according to the third characteristics included in the characteristics-measurement packet upon receiving the characteristics-measurement packet.

4. The multi-hop wireless network system according to claim 3, wherein the first radio device transmits a decision-request packet to the second radio device through the third radio device, the decision-request packet including quality required for the traffic and requesting a decision whether to allow or reject the quality maintenance request; and
the second radio device allows or rejects the quality maintenance request according to the third characteristics upon receiving the decision-request packet and transmits a first decision-reply packet or a second decision-reply packet to the first radio device through the third radio device, the first decision-reply packet including the allowance of the quality maintenance request and the quality required for the traffic, and the second decision-reply packet including the rejection of the quality maintenance request.

5. The multi-hop wireless network system according to claim 4, wherein the third radio device, upon receiving the first decision-reply packet from the second radio device, reserves a bandwidth meeting the quality required for the traffic included in the first decision-reply packet and transmits the first decision-reply packet to the first radio device, and upon receiving the second decision-reply packet from the second radio device, forwards the second decision-reply packet to the first radio device; and
the first radio device starts to transmit the traffic upon receiving the first decision-reply packet.

6. The multi-hop wireless network system according to claim 1, wherein the radio controller is provided in the third radio device;
the first and the third radio devices transmits the measured characteristics of the wireless communication path to the second radio device;
the third radio device allows or rejects the quality maintenance request according to the measured characteristics of the wireless communication path and transmits the allowance or the rejection of the quality maintenance request to the second radio device;
the second radio device, upon receiving the rejection of the quality maintenance request from the third radio device, transmits the rejection of the quality maintenance request to the first radio device, and upon receiving the allowance of the quality maintenance request from the third radio device, allows or rejects the quality maintenance request according to the received characteristics of the wireless communication path and transmits the allowance or the rejection of the quality maintenance request to the first radio device through the third radio device.

7. The multi-hop wireless network system according to claim 6, wherein
the first radio device measures first characteristics of the wireless communication path at the first radio device itself and transmits a characteristics-measurement packet to the third radio device, the characteristics-measurement packet including the measured first characteristics and requesting characteristics measurement of the wireless communication path;

the third radio device, upon receiving the characteristics-measurement packet, measures second characteristics of the wireless communication path at the third radio device itself, renews the first characteristics included in the characteristics-measurement packet to third characteristics using the measured second characteristics, and transmits to the second radio device a characteristics-measurement packet including the renewed third characteristics; and the second radio device allows or rejects the quality maintenance request according to the third characteristics included in the characteristics-measurement packet upon receiving the characteristics-measurement packet and the allowance of the quality maintenance request.

8. The multi-hop wireless network system according to claim 7, wherein the first radio device sequentially transmits a decision-request packet to the third radio device and the second radio device, the decision-request packet including quality required for the traffic and requesting a decision whether to allow or reject the quality maintenance request;

the third radio device, upon receiving the decision-request packet, allows or rejects the quality maintenance request according to the third characteristics and transmits to the second radio device the decision-request packet including a first flag or a second flag, the first flag allowing the quality maintenance request, and the second flag rejecting the quality maintenance request; and the second radio device, upon receiving the decision-request packet including the first flag, allows or rejects the quality maintenance request according to the third characteristics and transmits to the first radio device through the third radio device a first decision-reply packet or a second decision-reply packet, the first decision-reply packet including the allowance of the quality maintenance request and the quality required for the traffic, and the second decision-reply packet including the rejection of the quality maintenance request, and upon receiving the decision-request packet including the second flag, transmits the second decision-reply packet to the first radio device through the third radio device.

9. The multi-hop wireless network system according to claim 8, wherein the third radio device, upon receiving the first decision-reply packet from the second radio device, reserves a bandwidth meeting the quality required for the traffic included in the first decision-reply packet and transmits the first decision-reply packet to the first radio device, and upon receiving the second decision-reply packet from the second radio device, forwards the second decision-reply packet to the first radio device; and the first radio device starts to transmit the traffic upon receiving the first decision-reply packet.

10. The multi-hop wireless network system according to claim 1, wherein the radio controller is provided in the first radio device;

the first and the third radio devices transmit the measured characteristics of the wireless communication path to the second radio device;

the second radio device transmits the measured characteristics of the wireless communication path to the first radio device; and the first radio device allows or rejects the quality maintenance request according to the measured characteristics of the wireless communication path, and if the quality maintenance request is allowed, starts to transmit the traffic.

11. The multi-hop wireless network system according to claim 10, wherein the first radio device measures first characteristics of the wireless communication path at the first radio device itself, transmits a characteristics-measurement packet to the third radio device, the characteristics-measurement packet including the measured first characteristics and requesting characteristics measurement of the wireless communication path, and allows or rejects the quality maintenance request according to the third characteristics included in the characteristics-measurement packet upon receiving the characteristics-measurement packet including the third characteristics from the second radio device through the third radio device, the third characteristics being renewed from the first characteristics with the second characteristics of the wireless communication path at the third radio device;

the third radio device, upon receiving the characteristics-measurement packet, measures second characteristics of the wireless communication path at the third radio device itself, renews the first characteristics included in the characteristics-measurement packet to third characteristics using the measured second characteristics, and transmits to the second radio device a characteristics-measurement packet including the renewed third characteristics; and the second radio device, upon receiving the characteristics-measurement packet, transmits the received characteristics-measurement packet to the first radio device through the third radio device.

12. The multi-hop wireless network system according to claim 1, wherein the radio controller is provided in a fourth radio device that is different from any of the first to the third radio devices;

the first and the third radio devices transmit the measured characteristics of the wireless communication path to the second radio device;

the second radio device transmits the measured characteristics of the wireless communication path to the fourth radio device; and the fourth radio device allows or rejects the quality maintenance request according to the measured characteristics of the wireless communication path.

13. The multi-hop wireless network system according to claim 12, the first radio device measures first characteristics of the wireless communication path at the first radio device itself and transmits a characteristics-measurement packet to the third radio device, the characteristics-measurement packet including the measured first characteristics and requesting characteristics measurement of the wireless communication path;

the third radio device, upon receiving the characteristics-measurement packet, measures second characteristics of the wireless communication path at the third radio device itself, renews the first characteristics included in the characteristics-measurement packet to third characteristics using the measured second characteristics, and transmits to the second radio device a characteristics-measurement packet including the renewed third characteristics;

the second radio device receives the characteristics-measurement packet and transmits the received characteristics-measurement packet to the fourth radio device; and the fourth radio device allows or rejects the quality maintenance request according to the third characteristics included in the characteristics-measurement packet upon receiving the characteristics-measurement packet.

14. The multi-hop wireless network system according to claim 13, wherein, the first radio device transmits a decision-request packet to the fourth radio device, the decision-request packet including quality required for the traffic and requesting a decision whether to allow or reject the quality maintenance request; and the fourth radio device, upon receiving the decision-request packet, allows or rejects the quality maintenance request according to the third characteristics and transmits to the first radio device a first decision-reply packet or a second decision-reply packet, the first decision-reply packet including the allowance of the quality maintenance request and the quality required for the traffic, and the second decision-reply packet including the rejection of the quality maintenance request.

15. The multi-hop wireless network system according to claim 14, wherein the first radio device starts to transmit the traffic upon receiving the first decision-reply packet from the fourth radio device.

* * * * *